United States Patent [19]
Onoda et al.

[11] Patent Number: 6,073,180
[45] Date of Patent: Jun. 6, 2000

[54] HIGH-SPEED BATCH FILE TRANSFER METHOD AND APPARATUS, AND STORAGE MEDIUM IN WHICH A PROGRAM FOR EXECUTING THE TRANSFER IS STORED

[75] Inventors: Tetsuya Onoda, Yokosuka; Taro Yoshikawa; Satoshi Kotabe, both of Yokohama, all of Japan

[73] Assignee: Nippon Telegraph and Telephone Corporation, Japan

[21] Appl. No.: 08/973,323

[22] PCT Filed: Mar. 4, 1997

[86] PCT No.: PCT/JP97/00655

§ 371 Date: Nov. 6, 1997

§ 102(e) Date: Nov. 6, 1997

[87] PCT Pub. No.: WO97/33227

PCT Pub. Date: Sep. 12, 1997

[30] Foreign Application Priority Data

Mar. 7, 1996 [JP] Japan .................................... 8-050510
Mar. 7, 1996 [JP] Japan .................................... 8-050511
Jun. 25, 1996 [JP] Japan .................................... 8-164883

[51] Int. Cl.[7] .................................................... G06F 15/16
[52] U.S. Cl. ........................................... 709/234; 709/230
[58] Field of Search .................................... 709/230, 231, 709/232, 233, 235, 212; 711/111, 112, 117, 147, 148, 161; 710/31, 30, 33, 35, 60

[56] References Cited

U.S. PATENT DOCUMENTS

| | | | |
|---|---|---|---|
| 5,548,587 | 8/1996 | Barley et al. ........................... | 370/60.1 |
| 5,619,499 | 4/1997 | Nakaboyashi ........................... | 370/469 |
| 5,623,606 | 4/1997 | Yokoyama et al. ..................... | 395/250 |
| 5,687,347 | 11/1997 | Omura et al. ........................... | 395/439 |
| 5,734,918 | 3/1998 | Odawara et al. .................. | 395/800.01 |
| 5,737,634 | 4/1998 | Hamano et al. ......................... | 395/847 |
| 5,887,187 | 3/1999 | Rostoker et al. .................. | 395/800.29 |

FOREIGN PATENT DOCUMENTS

| | | |
|---|---|---|
| 1-211147 | 8/1989 | Japan . |
| 6-252897 | 9/1994 | Japan . |
| 7-184024 | 7/1995 | Japan . |

OTHER PUBLICATIONS

Craig Partridge, "Gigabit Networking," Addison–Wesley Publishing Company, pp. 195–251, 1994.

Craing Partridge, "Gigabit Network" translated by Takeshi Nishida, Softbank Corp., Tokyo, Jun. 22, 1995 (22. 06. 95), p. 174–190.

Tetsuya Kanada et al., "Netwarp: An Ultra–High–Throughput Computer Communications Service", IEEE Network Jan./Feb., 1997 vol. 11 No. 1, pp. 44–50.

*Primary Examiner*—Mehmet B. Geckil
*Attorney, Agent, or Firm*—Pennie & Edmonds LLP

[57] ABSTRACT

The high speed batch file transfer method according to the present invention comprises a procedure for transferring file data, using a first storage medium and a second storage medium possessing a faster input/output speed than this first storage medium, to a second storage medium while conducting processing such as compression and the like with regard to this file data within a first storage medium before designating a communication link at the first terminal source; designating a communication link following completion of processing with regard to the file data; and batch transferring the file data within the second storage medium to a network card without processing this data; and a mechanism for batch transferring to a second storage medium the aforementioned file data transmitted without processing to the network card, and then transferring this file data to a first storage medium while conducting processing such as expansion and the like.

17 Claims, 23 Drawing Sheets

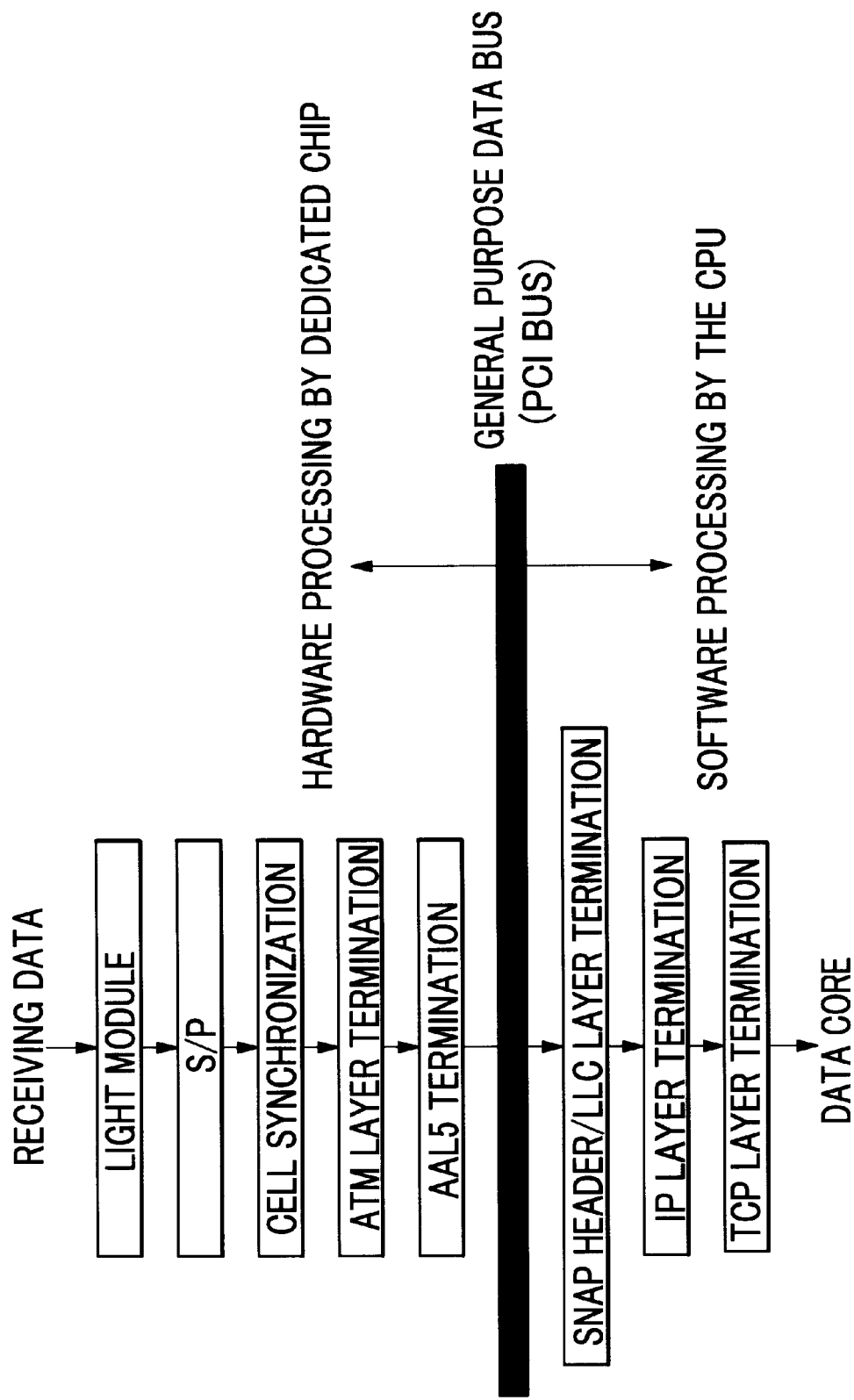

FIG.21

| PROTOCOL STACK | HARD WARE |
|---|---|
| ftp (APPLICATION) | CPU |
| TCP | |
| IP | |
| SNAP/LLC | |
| AAL(type5) | SARchip |
| ATM | ATMchip |
| PHY | LIGHT MODULE,S/P CONVERSION, CELL SYNCHRONIZED CIRCUIT |

HIGH-SPEED BATCH FILE TRANSFER METHOD AND APPARATUS, AND STORAGE MEDIUM IN WHICH A PROGRAM FOR EXECUTING THE TRANSFER IS STORED

BACKGROUND OF THE INVENTION

1. Technical Field of the Invention

The present invention relates to a high speed batch file transfer method, apparatus, and storage medium storing a program for executing said transfer method which are suitable for use in conducting communication between personal computers, work stations, various communication terminals and the like of devices which are connected in a network.

2. Background Art

Accompanying the development in the multi-media era, there exists an increasing demand for services which deliver large amounts of bulk data such as images and the like to user terminals from a server. With the current VOD (Video On Demand), due to the extreme increase in not only the transfer start orders of the file, but also control orders, e.g., pause, rewind and the like, which contribute to the load on the server processor, it is not possible to sufficiently appreciate the merits from the increased speed of the network. In contrast, for the sake of user convenience and economics, a system is being considered in which a large amount of bulk data corresponding to a single CD-ROM or movie is transmitted to a user storage medium in a few seconds to a few tens of seconds, followed by instant release of the network. The present invention provides a method and apparatus for achieving the aforementioned; the various components comprising the background of the present invention will be explained in detail below with reference to the figures.

FIG. 20A is a diagram showing the architecture of a general purpose computer equipped with an ATM network adapter card. FIG. 20B is a diagram showing the data flow at the time of receiving a large capacity file using a file transfer protocol. The file transfer protocol (ftp) is an application placed onto an internet protocol (TCP/IP) which is processed as software by means of a host CPU (central processing unit) of a computer containing the TCP/IP.

In addition, FIG. 21 shows a protocol stack of a file transfer protocol (ftp) in the case when using an ATM (Asynchronous Transfer Mode) link with the execution hardware written along side. TCP, IP and SNAP/LLC represent abbreviations for "transmission control protocol", "internet protocol" and "subnetweork access point/logical link control", respectively. In addition, AAL, SAR, PHY and S/P conversion are likewise abbreviations for "ATM adaptation layer", "segmentation and reassembly sublayer", "physical protocol" and "serial/parallel conversion", respectively.

Here, the action at the time of receiving a large capacity file using a file transfer protocol will be explained. Furthermore, the actions for transmission (sending) are identical with the sequence being simply reversed, and thus an explanation will be omitted. The data sent from the computer network E10 of ATM-LAN (Local Area Network) or the like is first received by ATM adapter card E5, and a physiological layer is terminated by means of a cell synchronized chip which is passed on to the ATM layer chip as 53-byte cell data to terminate the ATM layer.

Accordingly, in the ATM layer, separation by VCI/VPI (Virtual Path Identifier/Virtual Channel Identifier) and various processing are performed. According to the ALL layer (standard type 5), by means of a SAR chip, 48-byte information (SAR-PDU (Protocol Data Unit)) from which the cell header has been removed is linked, and CRC chip (Cyclic Redundancy Check) and data long check are conducted to form a CPCS (Convergence Sublayer Common Part)-PDU payload (see FIG. 20B). The CPCS-PDU payload is transferred as user data to the host CPU•E1 via a high speed general purpose bus (a PCI (Peripheral Component Interconnect Bus) is used here) and PCI bridge E4.

IP datagram is formed from the data sent to the host CPU•E1, and the CPU then sequentially terminates an IP layer, following which the core of the encapsulated file transfer data is fetched. Host CPU•E1 subsequently stores the core of the fetched transfer data in a hard disk E6 via PCI bus E3.

Further, in FIG. 20A, E30 is a CRT (Cathode-Ray Tube); E31 is a graphic board; E32 is a keyboard; and E33 is a keyboard controller, all of which are connected to the host CPU•E1 via PCI bus E3 and PCI bridge E4.

The aforementioned file transfer protocol is an application that is achieved by means of numerous protocol stacks wherein many of the subordinate protocols are processed by means of the host CPU. In particular, an enormous load is placed on the host CPU since the data arrival acknowledgment is conducted by the TCP layer.

As a result, even when data is transmitted from a high speed computer network as in ATM-LAN to a network adapter card at a high speed, and then transferred to a host CPU from said adapter card via a general purpose bus capable of high speed transfer such as a PCI, since most of the protocol is processed by means of the CPU, problems arise in that the file transfer throughput is limited by the processing capability of the CPU, and hence it is not possible to sufficiently realize the capability of the high speed computer network.

In the following, an explanation of a case in which data transfer of different communication speeds is included within the ATM network. FIG. 22 is an outline diagram of a data transfer procedure in the case when using a conventional ATM link, and an apparatus configuration for executing the same. Contents server B101 which stores the file data and terminal B102 which reads out the data within contents server B101 are connected to a single ATM switch B103, wherein each of the aforementioned possesses a different interface speed. In other words, the interface speed between contents server B101 and ATM switch B103 is 155 Mbps (Mega bits per second), while the interface speed between terminal B102 and ATM switch B103 is 25 Mbps.

In order for terminal B102 to access and read out file data within contents server B101, terminal B102 first designates and requests an ATM link with contents server B101 by means of signaling; ATM switch B103 then designates an ATM link between contents server B101 and terminal B102. This procedure is accomplished using the C-plane (call control signal transfer plane) in the figure. Subsequently, after establishing an ATM link, file data formed into an ATM cell is transferred from contents server B101 to terminal B102, which is accomplished using the U-plane (user information transfer plane) in the figure.

However, at this time, ATM switch B103 references only the header information (VCI, VPI) of the cell without processing the upper layers above AAL (ATM adaptation layer), and hence simply switches the cell from one port to another port. In addition, a large scale storage medium required for rate conversion does not exist within the interior of ATM switch B103. As a result, when the interface speeds of each of the ports of ATM switch B103 differ as stated above (155 Mbps and 25 Mbps), the transfer speed of the switch is determined by the lower speed (in this case 25 Mbps), and thus is not possible to effectively utilize the high speed interface (between contents server B101 and ATM switch B103).

Furthermore, with regard to the file data within contents server B101, when performing random access (i.e., not sequential access) such as rewind, fast forward or pause during the playing of image data, in addition to an excessive load which is placed on the contents server B101, the transfer speed is further reduced when performing random access from a plurality of terminals at the same time.

As explained in the aforementioned, according to data transfer of files by means of a conventional ATM link as shown in FIG. 22, ATM switch B103 does not possess a large capacity storage medium for rate conversion which is required at the time of performing data transfer of a large capacity file between ports with different interface speeds. Consequently, the transfer speed is limited by the low speed interface which leads to problems in that the high speed interface cannot be effectively utilized.

Further, in addition to the interface speed being limited to a low speed, when performing random access to a file such during access of an image and/or audio data file, an excessive load is placed on the contents server B101, which gives rise to further reduction of the file data transfer speed.

In the following, the background technology of the file data transfer protocol will be explained. TCP (Transmission Control Protocol) is a transport layer protocol which currently enjoys wide usage for communication between computers. In order to achieve a signal of high reliability, TCP conducts "handshake" between the transmitting and receiving sides (as described below) and retransmits the data in the case when data errors and/or omissions occurs. Furthermore, the "segment" used in the following represents the transfer unit of the TCP and corresponds to a packet or frame in other protocols.

At the transmitting side, the sequence number (SEQ) of the segment to be transmitted is mapped to a TCP header and then transmitted. This sequence number expresses the initial data position of the aforementioned segment within the entire data stream in terms of byte units, and following initiation at the time of establishing communication, sums the number of bytes of data transferred thereafter.

At the receiving side, upon correct receipt of the aforementioned segment, a response confirmation number is mapped to a TCP header and returned to the transmitting side as ACK (Acknowledgment). The object of this response confirmation number is to express the subsequent sequence number to be transmitted by the transmitting side, and also inform the transmitting side of correct sequential receipt of data without omissions.

The transmitting side waits for this ACK, and following receipt of the ACK, transmits the subsequent segment for the first time. If an ACK is not received within a fixed "time-out period", the initial segment is retransmitted. In the case of TCP, non-receipt of the aforementioned ACK within the time-out period is the sole mechanism for retransmission. FIG. 23 shows the retransmission procedure by means of TCP.

FIG. 23 is a diagram showing a time chart showing a TCP flow control in a between the sending side and receiving side of a conventional computer. FIG. 23 shows an example of transferring a 10 byte×5 segment data from a transmitting side to a receiving side. In addition, FIG. 23 shows a case in which the segment of sequence number SEQ=40 at the time of initial transfer is not correctly received by the receiving side. The transmitting side maps he sequence numbers SEQ=10, 20, 30, 40, 50 to the TCP headers of five respective segments nd then transmits the aforementioned. After correctly receiving the segments of SEQ=10, 20 and 30, the receiving side respectively maps ACK=20, 30 and 40 to TCP headers and then transmits aforementioned. In this manner, the transmitting side receives ACK=20, 30 and 40 within the predetermined time-out period for each segment.

According to this example, the segment of SEQ=40 is not correctly received at the receiving side at the time of the first transmission, and thus it is not possible for the transmitting side to receive ACK=50 within the predetermined time-out period from transmission of said segment of SEQ=40. Accordingly, upon elapse of the time-out period, the transmitting side determines that an error has occurred in segment of SEQ=40. In addition, since the ACK for segment of SEQ=50 is similarly not transmitted within the predetermined time-out period, the transmitting side retransmits segment of SEQ=50 at the point of elapse of the time-out period from the transmission of SEQ=50.

According to a method for carrying out response confirmation by means of only ACK, as in the aforementioned TCP, in order to receive a retransmission, it is necessary to await timer completion at the transmitting side. In addition, even in the case of when an error occurs in only one segment, it is necessary to retransmit all segments from thereon. As a result, once an error occurs, problems arise in that the number of segment to be retransmitted becomes increasing large. In this manner, in particular when transferring an application in which a large amount of bulk data is divided into numerous segments, for example, with regard to a method for forcibly performing retransmission of specific segments by returning a NAK (Negative Acknowledgment) from the receiving side, the aforementioned problem results in an extreme reduction of the transfer efficiency. Furthermore, high speed processing is difficult since response confirmation such as TCP or the like processes software following completion of the lower level layer termination up to the IP (Internet Protocol) layer.

SUMMARY OF THE INVENTION

In consideration of the aforementioned points, it is an object of the present invention to provide a high speed batch file transfer method, apparatus, and storage medium storing a program for executing said transfer method which improves on the degradation of the throughput at the time of file transfer resulting from CPU processing of the communication according to most protocols in the conventional technology. As a result, a high throughput that sufficiently utilizes the high speed computer network is achieved.

In addition, another object of the present invention is to allow for speed conversion of ATM links comprising different interface speeds, and, moreover, disperse large loads placed on the server by random access of large capacity files and the like, thereby acheiving a high transfer throughput.

In addition, another object of the present invention is to provide a data transfer method wherein reduction of the transfer efficiency stemming from response confirmation by software processing at each packet is avoided, and wherein a high throughput is obtained even in the case when dividing data into a plurality of packets and transmitting thereof.

In order to solve the aforementioned problems, according to a first aspect of the present invention, a file transfer method is provided comprising:

(a) a procedure for sequentially transferring file data to a second storage medium via a general purpose data bus while conducting at least one process from among compression, protocol termination and framing with regard to file data within a first storage medium prior to designating a communication link, at a transfer source of said file;

(b) a procedure for designating a communication link following completion of processing with regard to said file data at said transfer source of said file, and directly batch transferring file data within said second storage medium without processing to a network adapter card for use in computer communication which is connected to a general purpose data bus, and then transmitting said file data from said network adapter card to a network;

(c) a procedure for batch transferring said file data transmitted to said network adapter card, which is connected to a general purpose data bus of said transfer destination from said network, via said general purpose data bus without conducting any processing from among data expansion, protocol termination, and framing, and then releasing said communication link, at the transfer destination of said file; and (d) a procedure for transferring to said first storage medium sequentially processed data within said second storage medium via said general purpose data bus while conducting at least one process from among expansion processing and communication processing with regard to data within said second storage medium, at a transfer destination of said file, after releasing said communication link;

wherein a general purpose computer architecture is used which comprises a general purpose data bus for conducting data transfer, a first storage medium, and a second storage medium possessing a faster input/output speed than said first storage medium, at each of said file transfer source and file transfer destination.

In addition, the program for executing the file transfer method according to the present invention can be stored in a storage medium, and then distributed.

In addition, according to another aspect of the present invention, a file transfer apparatus is provided comprising:

(a) a transfer source computer which comprises, a first general purpose data bus for conducting data transfer;

a first storage medium;

a second storage medium possessing a faster input/output speed than said first storage medium;

a first network adapter card for use in computer communication which is connected to said first general purpose data bus;

a first transferring means for sequentially transferring file data to said second storage medium via said first general purpose data bus while conducting at least one process from among compression, protocol expansion and framing with regard to file data within said first storage medium, before designating a communication link;

a transmitting means for designating a communication link after completing said processing of said file data, directly batch transferring said file data to said first network adapter card via said first general purpose data bus without conducting processing with regard to file data within said second storage medium, and transmitting said file data from said first network adapter card to a network; and (b) a transfer destination computer which comprises, a second general purpose data bus for conducting data transfer;

a third storage medium;

a fourth storage medium possessing a faster input/output speed than said third storage medium;

a second network adapter card for use in computer communication which is connected to said second general purpose data bus;

a releasing means for batch transferring said file data, prior to being transmitted from said network to said second network adapter card, to said fourth storage medium via said second general purpose data bus without conducting processing including data expansion, protocol compression or framing, and releasing said communication link; and a second transferring means for transferring sequentially processed data within said fourth storage medium to said third storage medium following release of said communication link, via said second general purpose data bus while conducting at least one process from among expansion processing and communication processing with regard to data within said fourth storage medium.

The file transfer method of the present invention is characterized in that most of the processing such as protocol termination and the like performed by the CPU according to the conventional technology is not performed at the time of data transmission. In addition, the throughput of file transfer is increased since file data is batched and then inputted/outputted between memory, capable of high speed input/output such as a host memory or the like, and a network adapter card. As a result, a high speed computer network can be effectively utilized since the network is released after a brief period of time.

In addition, the file data temporarily stored in memory is sequentially stored from a low speed, large capacity storage medium such as a hard disk at the transmitting side prior to designating the communication link of the network, and then sequentially stored into a disk at the file receiving side after release of the network. At the time of data transfer between this memory and hard disk, since the hard disk input/output is sufficiently slower when compared with the transfer speed of a general purpose data bus, by utilizing this difference, processing such as protocol processing becomes possible.

According to the file transfer method of the present invention, in order to effectively utilize a high speed network, file data is batch transferred between a first or third storage medium and a second or fourth storage medium possessing a faster speed than said first or third storage medium such that the transfer speed of the network adapter card is not restricted, wherein processing by the central processing unit does not occur during this interval. Data transfer between said second or fourth storage medium and said first or third storage medium is conducted during network release, i.e., before file transmission at the file transfer source, and after file transmission at the transfer destination. At this time, data is sequentially transferred between said second or fourth storage medium and said first or third storage medium while performing processing such as data compression.expansion, protocol termination and the like by utilizing the speed difference between the writing speed of said first or third storage medium and said general purpose data bus. In this manner, at the time of file transfer, it is possible to achieve a high network throughput, and also release the network after a brief period, even at the time of large capacity file transfer.

BRIEF EXPLANATION OF THE DRAWINGS

FIG. 20B is a flow diagram showing the data flow at the time of receiving a large capacity file using a conventional file transfer protocol.

FIG. 21 is a collective diagram showing a protocol stack of a file transfer protocol using an ATM link and the hardware for executing the same.

PREFERRED EMBODIMENTS OF THE INVENTION

Figure 1:
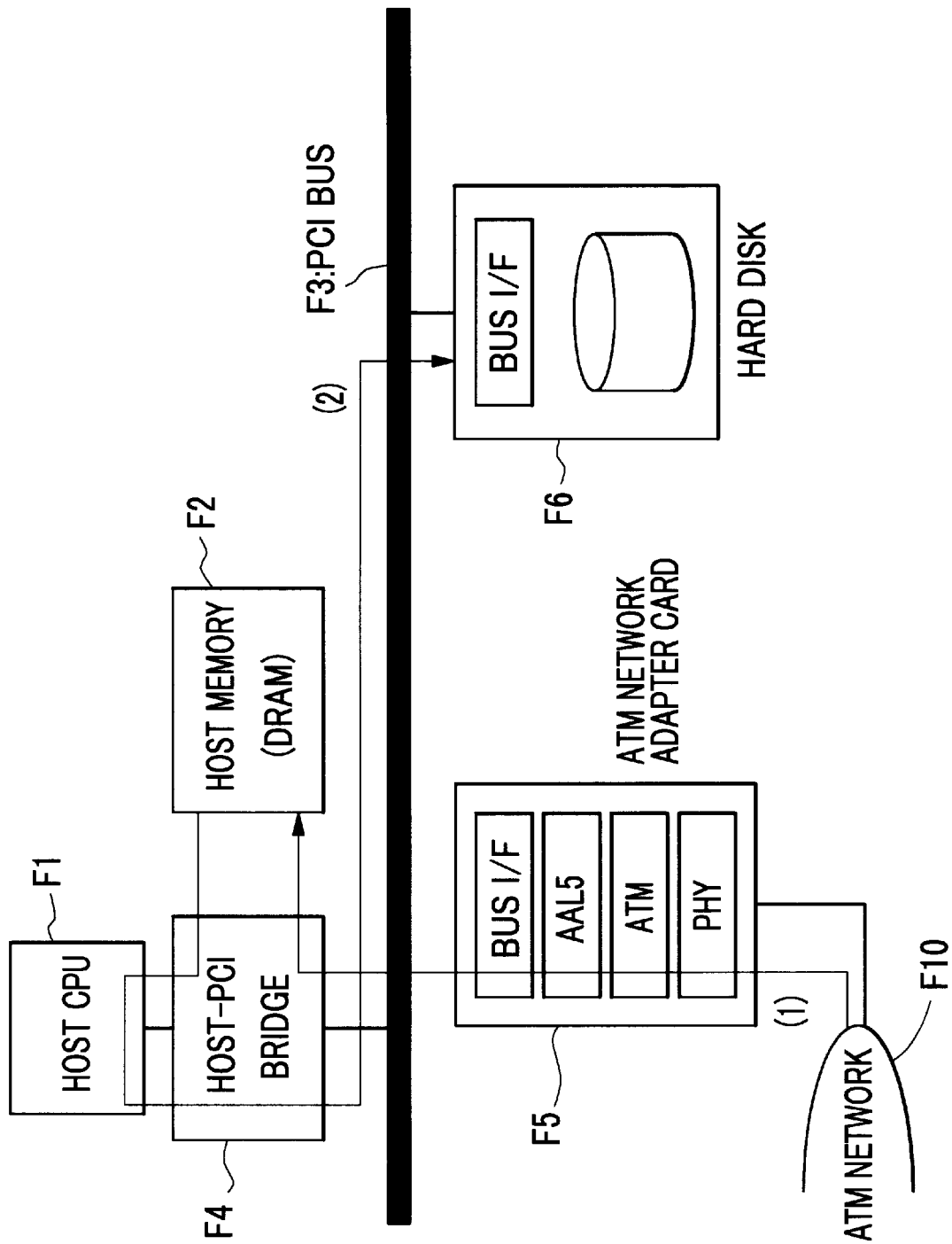
FIG. 1 is a block diagram showing a structural example of a computer connected to an ATM network and the file data flow according to a preferred embodiment of the present invention.

FIG. 1 is a diagram showing a structural example of a computer connected to an ATM network, and the file data flow of the same, for executing a file transfer method according to the present invention wherein an apparatus configuration is provided which uses a host memory formed from a hard disk as first and third storage media and semiconductor memory (DRAM: Dynamic Random Access Memory) as second and fourth storage media.

The configuration shown in FIG. 1 includes host CPU•F1, host memory comprising DRAM or the like, PCI bus F3 comprising a high speed general purpose bus, host-PCI bridge F4 connecting CPU and PCI, ATM network adapter card F5 (or network interface card) for terminating from the physiological layer to AAL layer, hard disk F6, and ATM network F10.

In the following, the procedures occurring at the receiving side will be explained, with reference to FIGS. 1 to 4, with regard to the aforementioned configuration, in the case when transmission of a large capacity file from an ATM network F10 such as ATM-LAN or the like is performed. Furthermore, FIG. 4 is a flow diagram showing a processing procedure at the transfer destination of the file data in the structure shown in FIG. 1.

Figure 4:
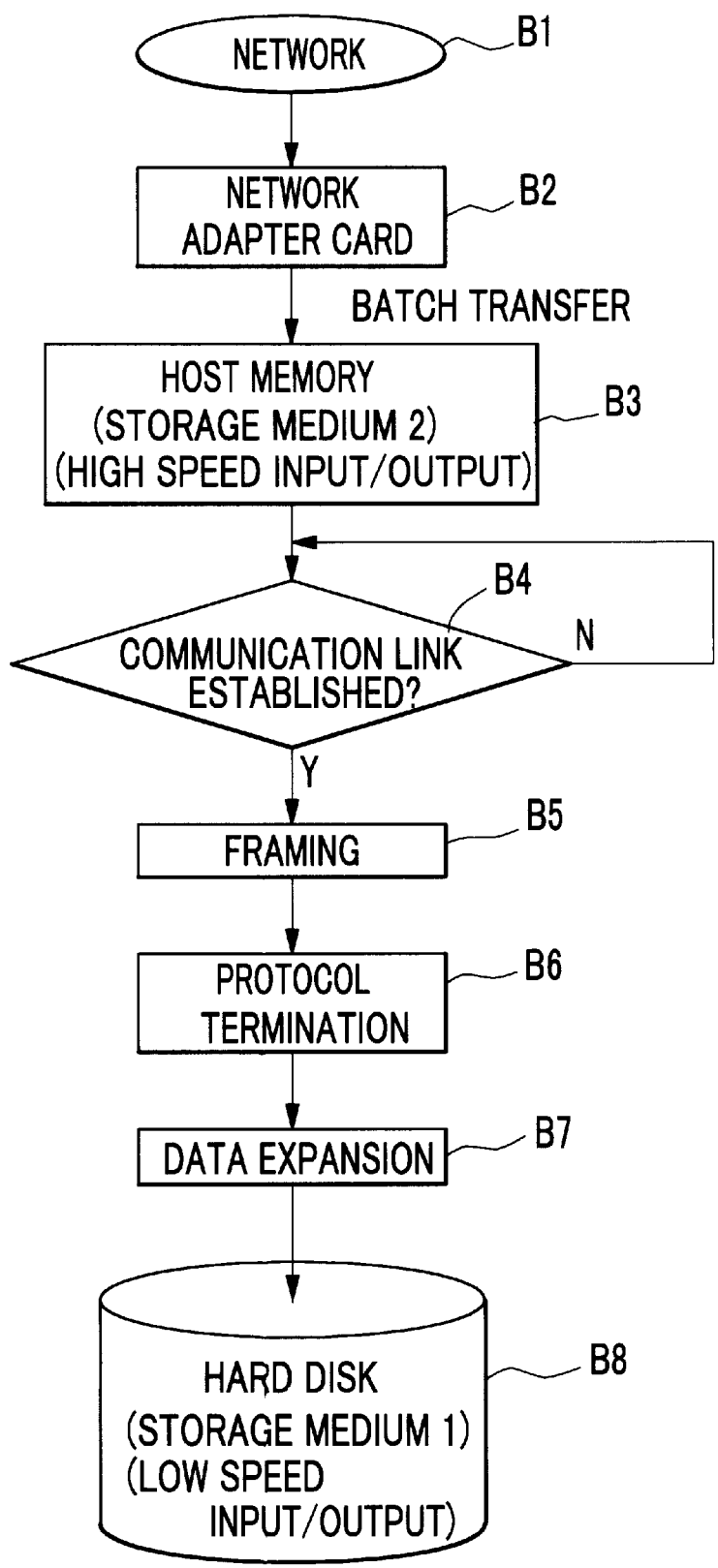
FIG. 4 is a flow diagram showing a processing procedure at the transfer destination of the file data in the structure shown in FIG. 1.

Initially, the transferred file is transmitted from ATM network F10 to ATM network adapter card F5 (steps B1~B2 of FIG. 4). Within ATM network adapter card F5, optical signal termination, S/P conversion and termination of the cell synchronous physiological layer (PHY) are performed, after which data is transferred sequentially to the upper layers including the ATM layer and AAL. In the ATM layer, essentially, multi-separation of the cell is performed by means of VCI/VPI; in the AAL layer, CPCS-PDU is formed by means of linking the cell 48-byte payload, and after performing CRC and length checks, CPCS-PDU payload is extracted as user data.

The file data extracted following termination of the ATM and AAL layers is then transferred from a bus I/F chip (Bus I/F) of a PCI bus to PCI bus F3. At this time, host-PCI bridge F4 is selected by a bus I/F chip of ATM network adapter card F5 as the transfer destination of the file data. The high speed data transfer of the data transferred from the network adapter card F5 is then conducted to host memory F2 via host-PCI bridge F4 (steps B2~B3). The data accumulated in a batch in host memory F2 is then kept in the CPCS-PDU payload state. High speed processing is possible since the steps up to CPCS are completed by the hardware within adapter card F5. Moreover, data transfer of PCI bus F3, host-PCI bridge F4, DRAM•F2 are all conducted by hardware, and thus there is no limitation of the transfer speed from software processing.

Following completion of file data transfer, the ATM terminates the ATM link and releases network F10. The data accumulated as a batch in host memory F2 exists in a CPCS-PDU payload state, and the expansion processes and the like in the case of a compressed file are not performed. Since these processes are software processes conducted by the CPU, such processing, if conducted at the same time as data transfer, as in conventional methods, would result in extreme reduction of the file transfer throughput. However, according to the present invention, file transfer is performed at a high speed with the file in the compressed state by host memory F2, and processing such as expansion and the like are conducted by the CPU•F1 after the network F10 has been released.

Following release of the network F10, the CPU•F1 establishes a communication link with respect to the data accumulated in batch form in the CPCS-PDU payload state in host memory F2 (step B4). CPU•F1 then conducts framing (step B5), protocol termination (step B6) and, as necessary, data expansion (step B7) with regard to the data in the CPCS-PDU payload state. CPU•F1 subsequently extracts the core of the data to be transferred and stores the extracted data in a hard disk F6 (step B8).

In this manner, although the file which is finally sent is stored in large capacity storage media such as hard disks, optical magnetic disks, magnetic tapes and the like (hard disk F6 is used in this example), the maximum speed for continuously writing and reading out from hard disk F6 is sufficiently slow when compared to the maximum transfer speed of general purpose bus F3. Consequently, with regard to the transfer from host memory F2 to hard disk F6, a transfer which continuously utilizes the maximum transfer speed of PCI bus F3 is not performed, and instead intermittent transfer to a buffer memory within a bus interface equipped with a hard disk is conducted which is matched with the low writing speed to the magnetic storage medium of hard disk F6.

During a pause in the writing of data into hard disk F6 from host memory F2, the CPU•F1 is able to conduct processing such as expansion and the like with regard to the file data within host memory F2, and thus reduction of the writing speed to hard disk F6 from such processing does not occur.

In the following, with regard to the configuration shown in FIG. 1, the procedures occurring at the transmitting side will be explained with reference to FIGS. 1 to 5, in the case when transmission of a large capacity file from host CPU 1 to an ATM network F10 is performed. Furthermore, the procedures at the transmitting side occur in reverse flow to the procedures at the receiving side, such that the flow is the reverse of the sequence at the receiving side shown by the arrow in FIG. 1.

Initially, the file to be transferred is stored into a disk F6 (step A1). The CPU•F1 then conducts, while reading out data stored in hard disk F6, data compression (step A2), protocol termination (step A3) and framing (step A4). This data is subsequently stored in host memory F2 in a CPCS-PDU payload state (step A5).

Subsequently, CPU•F1 establishes an ATM link (step A6), and orders a file transfer with respect to network adapter card F5 (step A7). Network adapter card F5 then directly reads out data stored in the CPCS-PDU payload state in host memory F2 via PCI bus F3, divides it into SAR-PDU by means of the AAL layer, and then transmits it to ATM network F10 as an ATM cell (by means of an ATM layer) via a physiological layer (step A8). Subsequently, upon completion of file transmission, CPU•F1 releases the communication link.

In this manner, at the time of file transfer, the data following execution of data compression, protocol termination and framing is stored in host memory F2, and this data stored in host memory F2 is directly read out from network adapter F5 and transmitted to network F10. Thus, readout processing from hard disk F6 and data processing by means of CPU•F1 do not reduce the transmission speed of network adapter F5.

Figure 5:
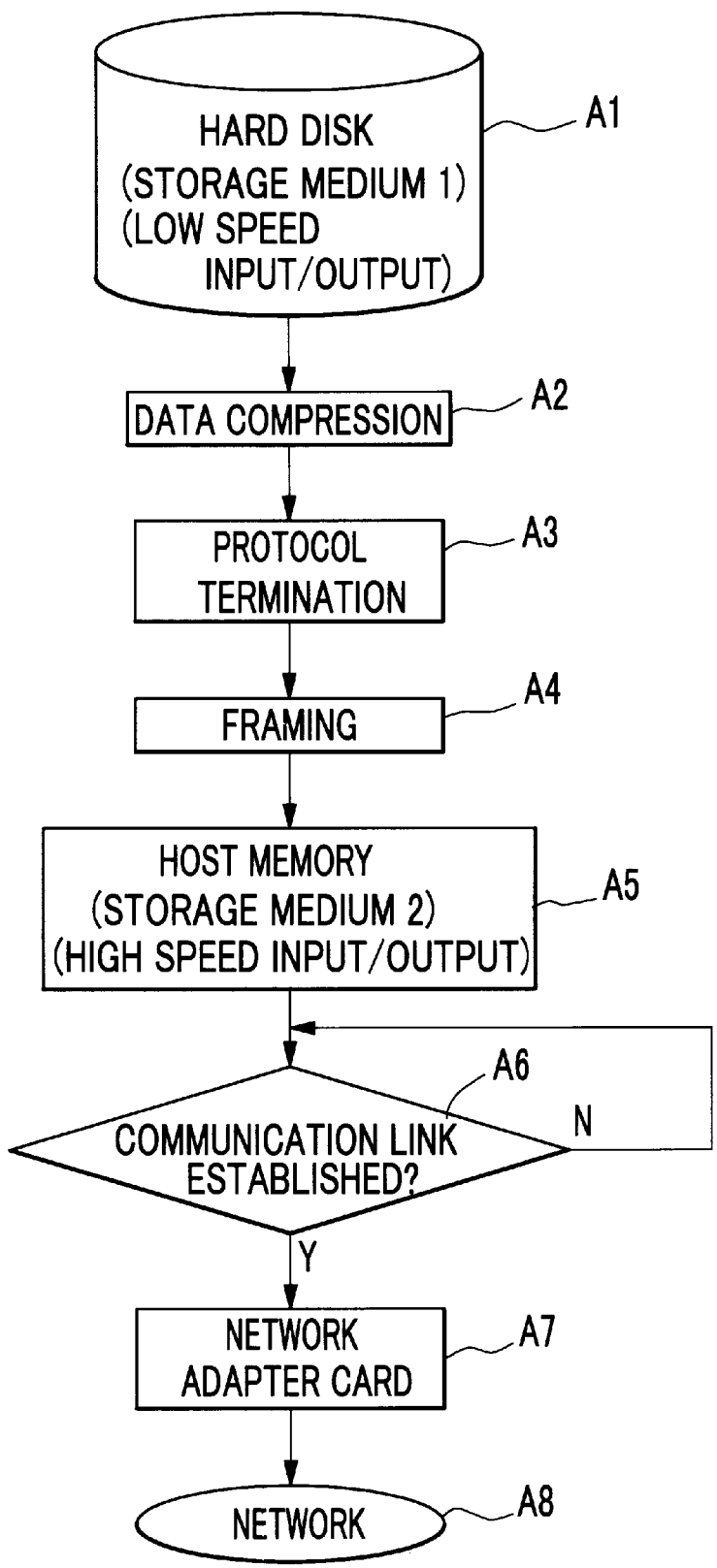
FIG. 5 is a flow diagram showing a processing procedure at the transfer source of the file data in the structure shown in FIG. 1.
Figure 6:
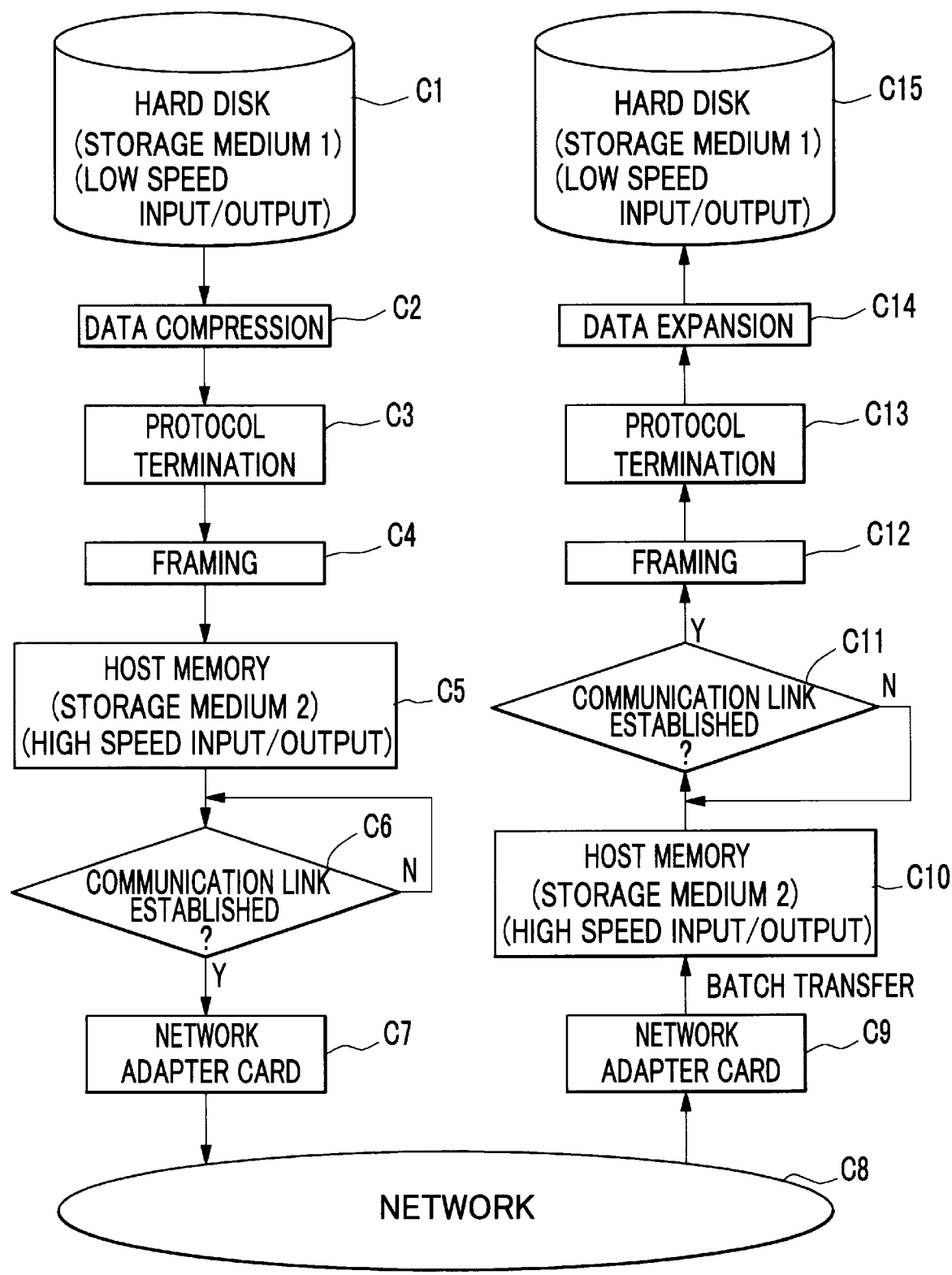
FIG. 6 is a flow diagram showing a processing procedure from file data signal transmission to signal reception in the structure shown in FIG. 1.

FIG. 6 is a processing flow diagram for showing as a consecutive process the procedures at the transfer destination according to the file transfer method of the present invention shown in FIG. 4, and the procedures at the transfer source according to the file transfer method of the present invention shown in FIG. 5. In FIG. 6, steps C1~C8 correspond to the processes of steps A1~A8 shown in FIG. 5, while steps C8~C15 correspond to the processes of steps B1~B8 shown in FIG. 4. As shown in FIG. 6, by performing data transfer between host memory F2 and network adapter card F5 without proceeding through a host CPU•F1, at both the file transfer source and transfer destination, it is possible to further increase the transfer throughput of the file.

In the following, a modification of the embodiment described in FIG. 1 will be explained with reference to FIG. 2. The embodiment of the present invention shown in FIG. 2 is equipped with a hard disk, as said first and third storage media, and, in place of the aforementioned host memory, a memory board via a semiconductor memory that is capable of high speed input/output which is installed in a general purpose data bus identical to that of the network adapter card, as said second and fourth storage media.

Figure 2:
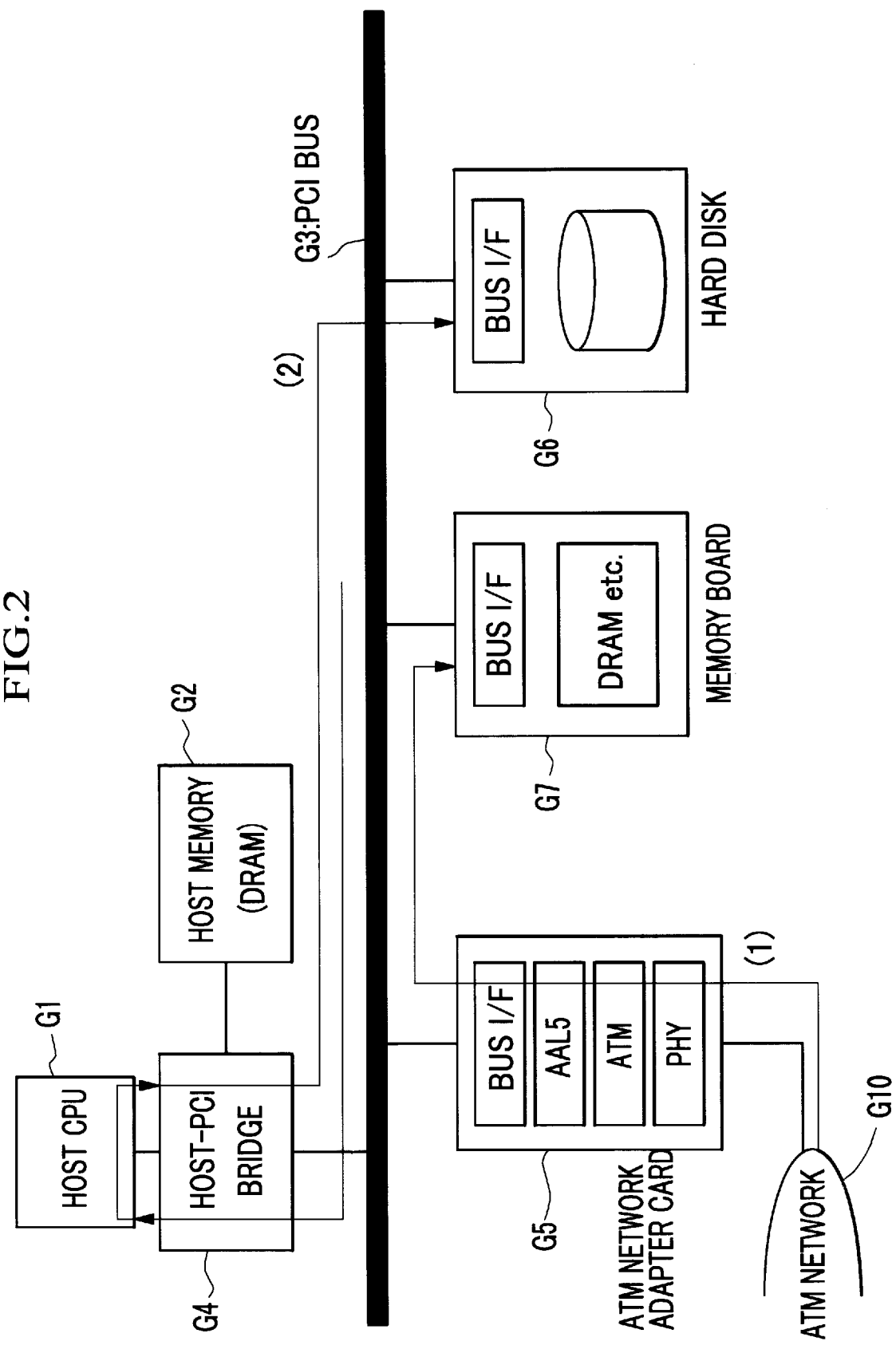
FIG. 2 is a block diagram showing a structural example of a computer connected to an ATM network and the file data flow according to another preferred embodiment of the present invention.

The configuration shown in FIG. 2 includes host CPU•G1, host memory G2 comprising DRAM or the like, PCI bus G3 comprising a high speed general purpose bus, host-PCI bridge G4 connecting CPU and PCI, ATM network adapter card G5 for completing from the physiological layer to AAL layer, hard disk G6, memory board G7 installed onto a PCI bus comprising DRAM or the like, and ATM network G10. Furthermore, the structures denoted by the same numerals as in FIG. 1 correspond to the same structures shown in FIG. 1.

In the following, the procedure for transferring a large capacity file from an ATM network such as ATM-LAN or the like will be explained with regard to the configuration shown in FIG. 2. The file is transmitted from ATM network G10 to ATM network adapter card G5. Within ATM network adapter card G5, termination is performed sequentially with regard to the physiological layer, ATM layer and AAL, and the data is then transferred to the upper layers. The file data extracted following termination of the AAL layer is then transferred from a bus I/F chip (Bus I/F) of a PCI bus to PCI bus F3. The bus I/F chip of ATM network adapter card G5 at this time differs from that shown in FIG. 1, and designates memory board G7 on the same PCI bus G3 as the transfer destination target of the file data.

The network adapter card G5 and memory board G7 are the agents of the same PCI bus G3, and hence it is possible to write the file data sent by high speed transmission from ATM network G10 into memory board G7 without having to drop the throughput. In addition, when compared with the configuration shown in FIG. 1, it can be said that the aforementioned configuration channels the portion not used for host memory G2 into large capacity file transfer.

In this configuration, following completion of file data transfer, the ATM terminates the ATM link and releases the network. The data accumulated in memory board G7 in PCI bus G3 exists in a CPCS-PDU payload state, and the expansion processes and the like in the case of a compression file are not performed. In the same manner as in FIG.

1, processing with regard to the file data is successively conducted by the CPU•G1 before transferring to a hard disk using the difference in the writing speed to the hard disk and the transfer speed of the bus.

Figure 3:
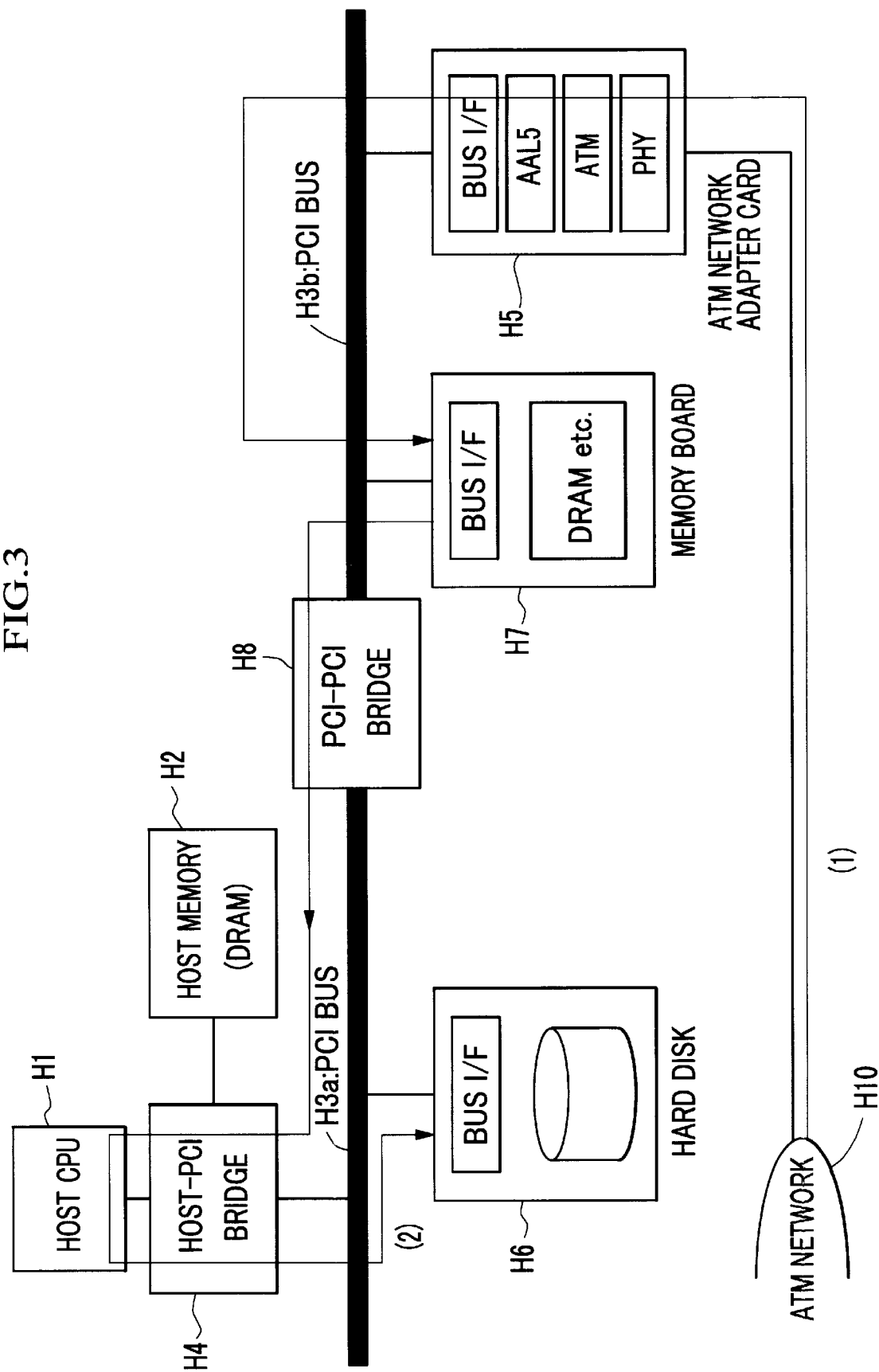
FIG. 3 is a block diagram showing a structural example of a computer connected to an ATM network and the file data flow according to another preferred embodiment of the present invention.

FIG. 3 is a diagram showing another preferred embodiment in which the general purpose data bus is expanded by means of providing a bridge chip onto the general purpose data bus shown in FIG. 2, and another general purpose data bus is newly constructed such that the network adapter card and memory board are connected by means of this newly constructed general purpose data bus.

The configuration shown in FIG. 3 includes host CPU•H1, host memory H2 comprising DRAM or the like, PCI bus H3a and H3b each comprising a high speed general purpose bus, host-PCI bridge H4 connecting CPU and PCI, ATM network adapter card H5 for conducting termination from the physiological layer to AAL layer, hard disk H6 housing a bus interface, PCI-PCI bridge H8 connecting two PCI buses, and ATM network H10.

In the following, the procedure for transferring a large capacity file from an ATM network such as ATM-LAN or the like will be explained with regard to the configuration shown in FIG. 3. The file is transmitted from ATM network H10 to ATM network adapter card H5. Within ATM network adapter card H5, termination is performed sequentially with regard to the physiological layer, ATM layer and AAL, and the data is transferred to the upper layers. The data from the file removed following termination of the AAL layer is then transferred from a bus I/F chip (PCI bus controller) of a PCI bus to PCI bus H3b. The PCI bus H3b differs from that shown in FIGS. 1 and 2 in that this PCI bus H3b is newly constructed by means of a PCI-PCI bridge as shown in the figure, which differs from the original PCI bus H3a which is connected to the CPU and host memory by means of a host-PCI bridge. This newly established PCI bus H3b is independent from the original PCI bus H3a.

ATM adapter card H5 and a memory board H7 similar to the memory board G7 shown in FIG. 2 are connected to this newly established PCI bus H3b, wherein the bus I/F chip of the adapter card H5 designates the memory board H5 in a similar PCI bus H3b as the transfer destination target of the file data, in the same manner as in the case of FIG. 2. The network adapter card H5 and memory board H7 are the agents of the same newly established PCI bus H3b, and hence it is possible to write the file data sent by high speed transmission from ATM network H10 into memory board H7 without having to drop the throughput.

Figure 20A:
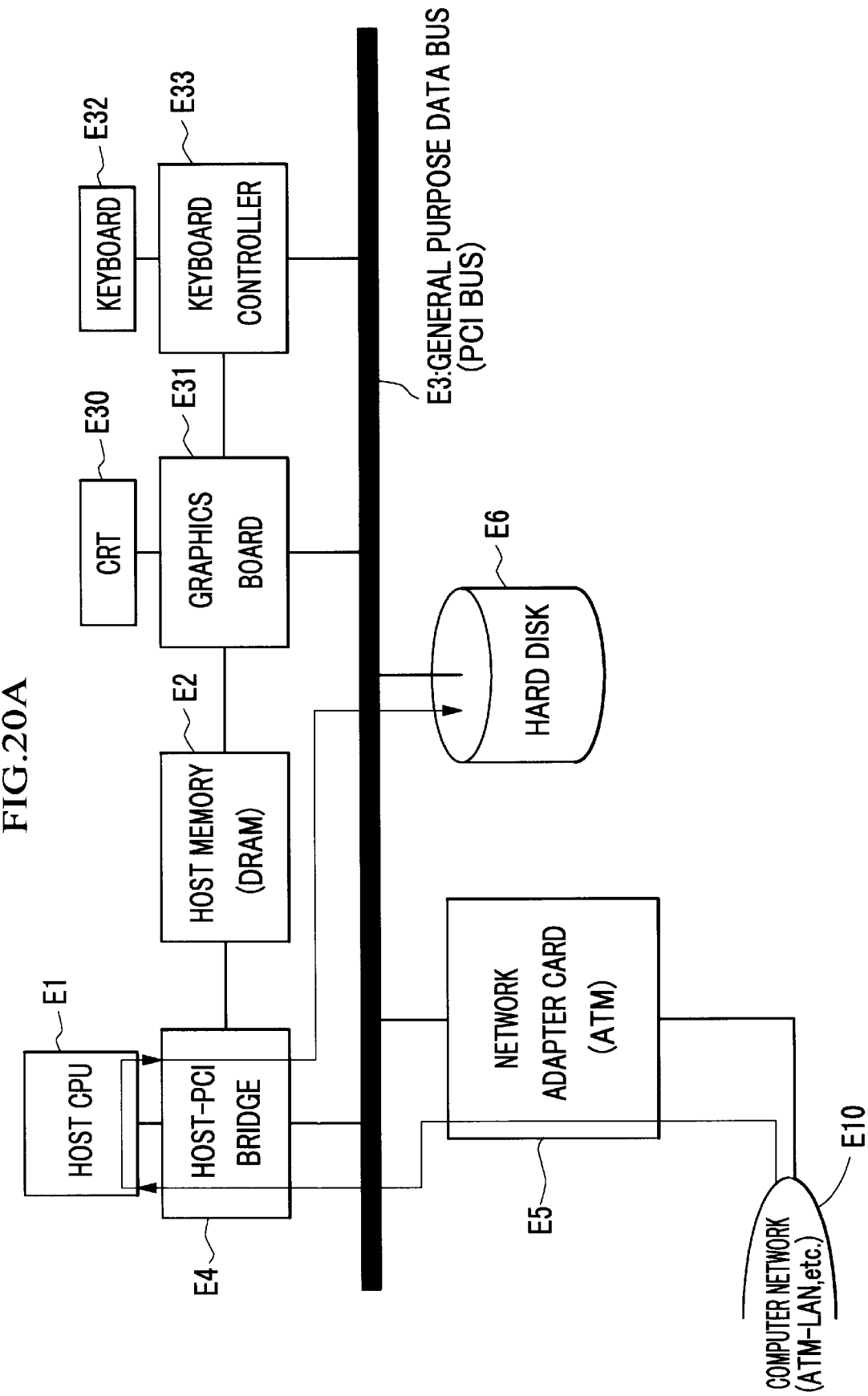
FIG. 20A is a block diagram showing the architecture of a general purpose computer equipped with an ATM network adapter card.
Figure 22:
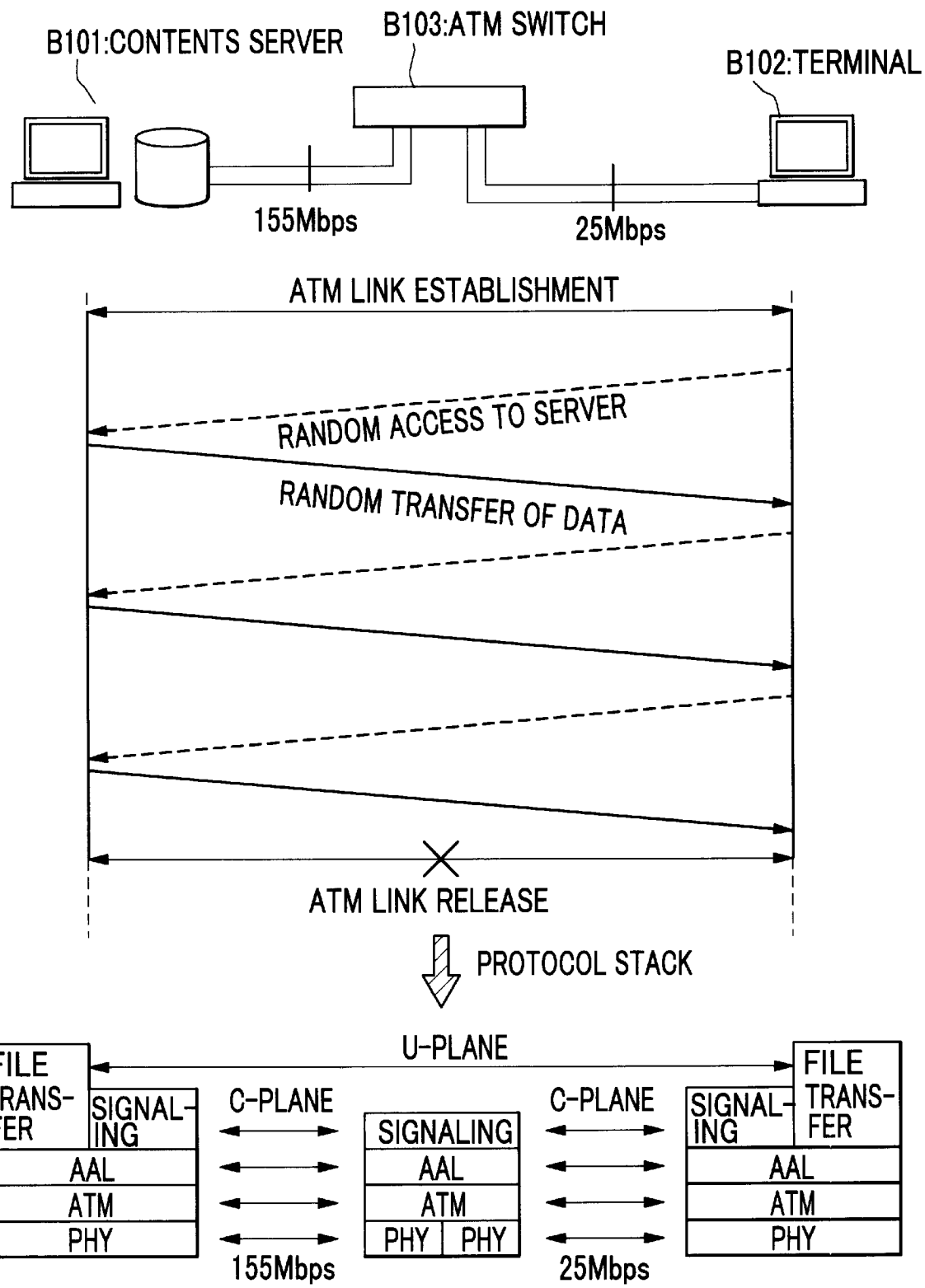
FIG. 22 is an outline diagram of a data transfer procedure in the case when using a conventional ATM link, and an apparatus configuration for executing the same.
Figure 23:
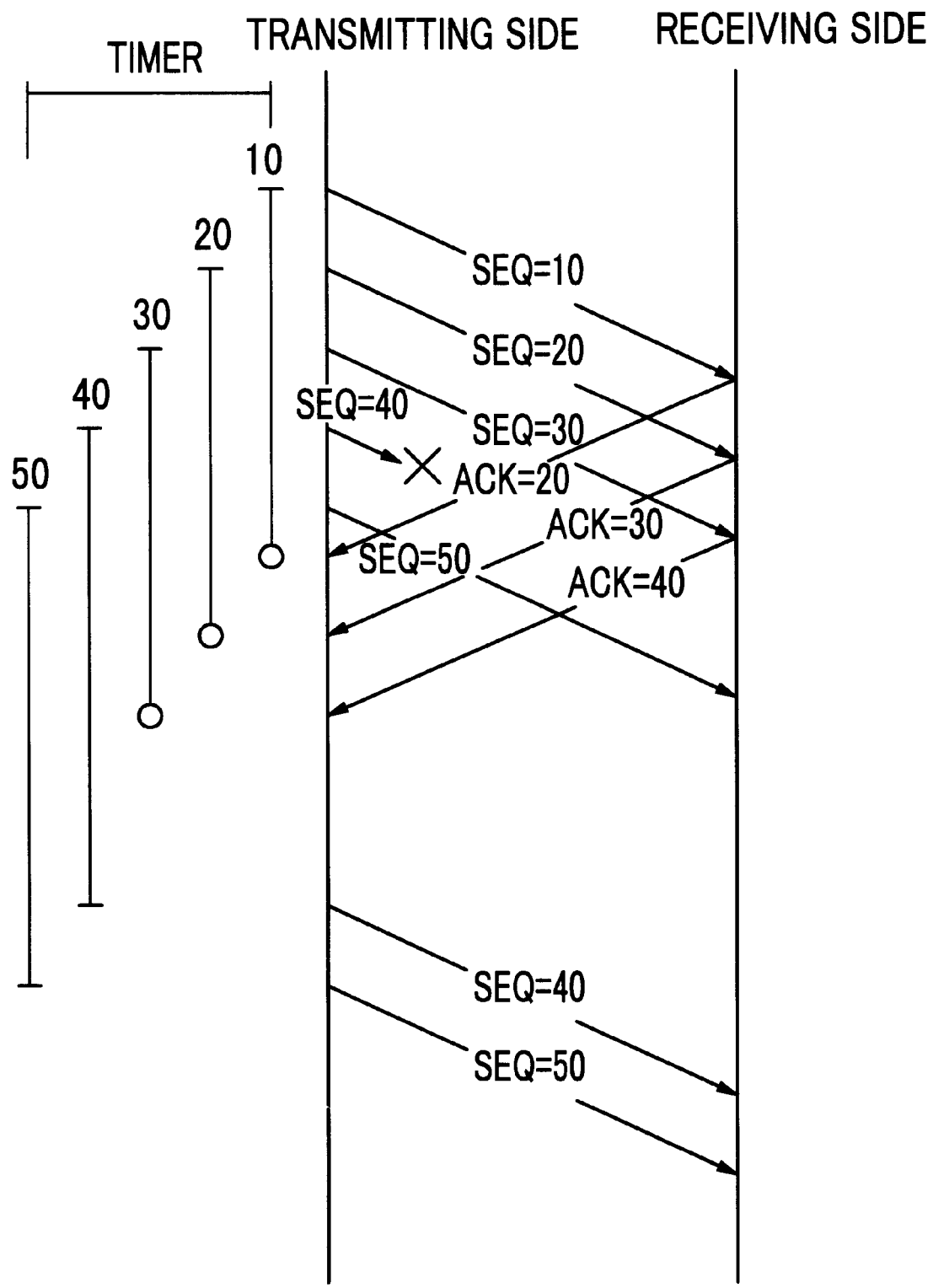
FIG. 23 is a diagram showing a time chart showing a TCP flow control in a between the transmitting side and receiving side of a conventional computer.

In addition, when compared with the case in FIG. 2, since other PCI boards (agents) are not connected to PCI bus H3b onto which memory board H7 is loaded, it is possible to allow the bus to be exclusive. Normally, a graphics board, keyboard, another peripheral device such as an interface board or the like are connected to the initial PCI bus H3a such that it is impossible for the ATM network adapter card and memory board to allow complete independence of the bus (see FIG. 20A). In this case, there are times when the throughput of the PCI bus data transfer is reduced secondary to a bus request from another PCI agent; it is possible to ensure a high throughput between adapter card H5 and memory board H7 by means of providing a bus which is separate from the aforementioned other PCI agent for the bus onto which adapter card H5 and memory board H7 are loaded as shown in FIG. 3. In particular, since the bus can be made exclusive, it is possible to achieve a high throughput even in the case of transferring high capacity files.

In the aforementioned configuration, following completion of file data transfer, the ATM terminates the ATM link and releases the network. The data accumulated in memory board H7 in PCI exists in a CPCS-PDU payload state, wherein expansion processes and the like in the case of a compression file are not performed. In the same manner as in FIG. 1, processing with regard to the file data is successively conducted by the CPU•H1 before transferring to a hard disk H6 using the difference in the writing speed to the hard disk and the transfer speed of the bus. At this time, the data within memory board H7 is transferred to the PCI bus H3a onto which CPU•H1 is loaded via PCI-PCI bridge H8. After the data that is transferred to PCI bus H3a is processed through CPU•H1, it is accumulated in hard disk H6 which is connected to the PCI bus H3a onto which CPU•H1 is loaded.

In this manner, in each of the configurations of FIGS. 1~3, transfer to memory comprising DRAM or the like is accomplished without processing by the CPU in a manner such that the high transfer speed from a high speed communication ATM network adapter card is not limited. Accordingly, it is possible to release the network at an early time point, and hence effectively utilize a high speed network. Due to the slow continuous writing speed of the magnetic storage medium e.g., hard disk or the like which serves as the final storage destination, transfer can only be performed by intermittently using a high speed general purpose bus. In this manner, processes such as expansion and the like are performed during periods when data transfer to the hard disk is interrupted.

Figure 7:
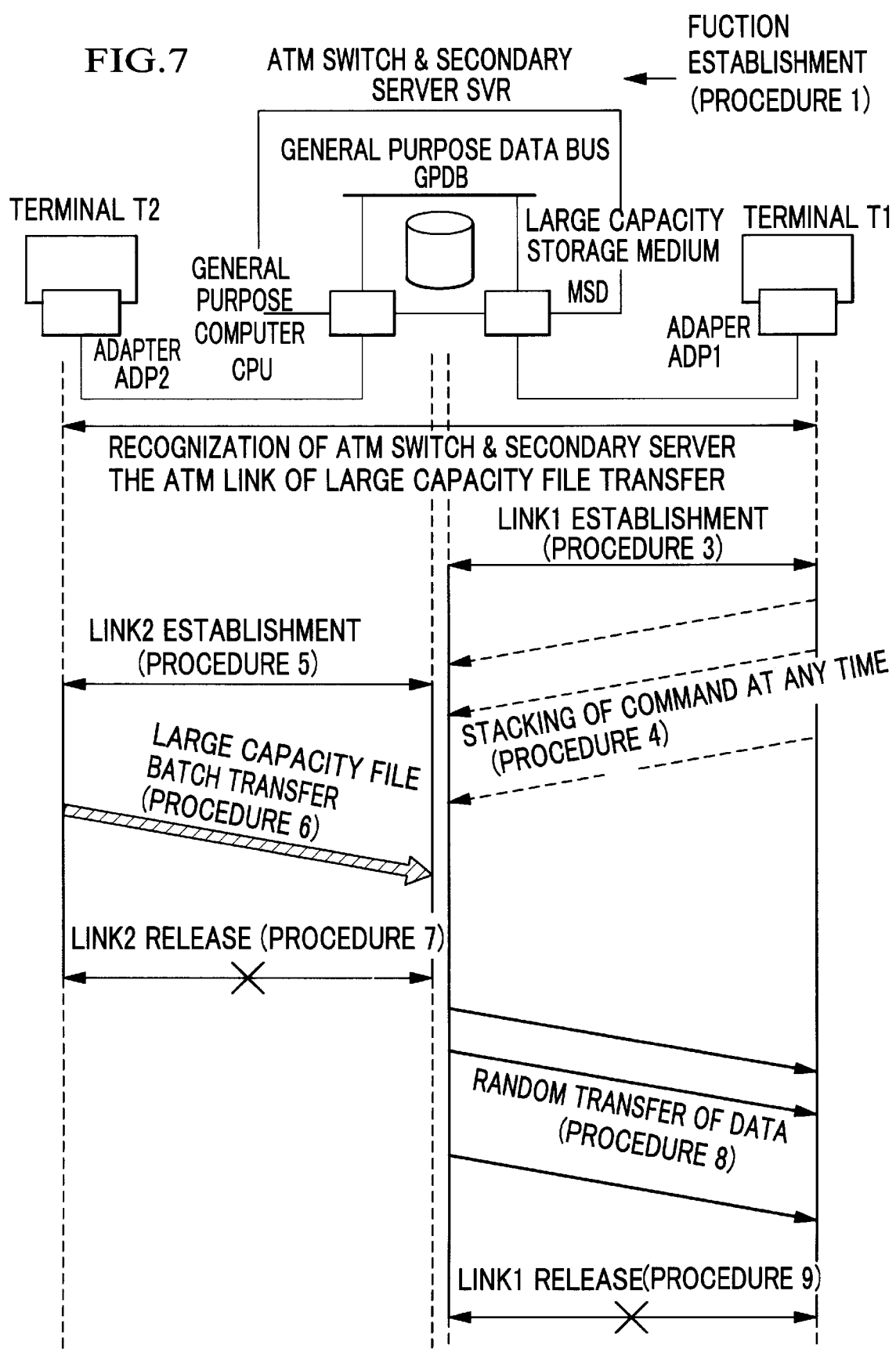
FIG. 7 is a diagram explaining a procedure of an ATM file transfer method according to a preferred embodiment of the present invention.

In the following, each of the preferred embodiments of the present invention described in the aforementioned using FIGS. 1~6 will be explained in the case when data transfer of a different communication speed is encountered within the ATM network. In FIG. 7, general purpose computer GPC possesses a CPU (central processing unit), a large capacity storage medium MSD such as a hard disk, host memory or the like, a plurality of ATM adapters, and a general purpose data bus GPDB for performing data transfer between the aforementioned. These components correspond, for example, to the host CPU•F1 and peripheral devices used at the receiving side according to the preferred embodiment shown in FIG. 1. In this case, general purpose computer GPC functions as an ATM switch & secondary server SVR to which terminals T1 and T2 are connected via ATM adapters ADP1 and ADP2, respectively. This terminal T2 corresponds to the host CPU•F1 and peripheral devices used at the transmitting side according to the preferred embodiment shown in FIG. 1. Consequently, the preferred embodiment shown in FIG. 7 corresponds to a configuration in which another terminal (in this case terminal T1) is connected to the host CPU•F1 and peripheral devices used at the receiving side, shown in FIG. 1, via a network adapter card.

According to the preferred embodiment shown in FIG. 7, it is possible to accomplish communication, for example, by means of the following procedures 1~9.

(Procedure 1)

ATM cell is transferred between a plurality of ATM adapters via general purpose data bus GPDB by means of aligning VCI and VPI of the ATM cell with the address within general purpose data bus GPDB. In addition, general purpose computer GPC functions as an ATM switch & secondary server SVR by means of storing data from adapters ADP1 and ADP2 in a large capacity storage medium MSD.

(Procedure 2)

At the time when terminal T1 conducts file transfer, in order to readout a large capacity file from terminal T2, ATM switch & secondary server SVR are recognized as the ATM link for large capacity file transfer by means of the contents of the informational components contained in a signaling cell for designating a link from terminal T1 with respect to terminal T2.

(Procedure 3)

ATM switch & secondary server SVR serve as terminal T2 such that a link 1 is designated over the interval between terminal T1 and large capacity storage medium MSD by means of signaling between terminal T1.

(Procedure 4)

By means of link 1, a random access command for a large capacity file from terminal T1 is sent from terminal T1 to ATM switch & secondary server SVR and then stacked onto a FIFO within an I/F controller of large capacity storage medium MSD.

(Procedure 5)

ATM switch & secondary server SVR serve as terminal T1 such that a link 2 is designated over the interval between terminal T2 and large capacity storage medium MSD by means of signaling between terminal T2.

(Procedure 6)

After establishing link 2, a large capacity file to be accessed by terminal T1 is sequentially read out using link 2, and instead of being transferred to terminal T1, is sent by batch transfer to large capacity storage medium MSD via general purpose data bus GPDB.

(Procedure 7)

After completing file transfer to a large capacity storage medium MSD, the link 2 between the terminal T2 and ATM switch & secondary server SVR is released by means of signaling.

(Procedure 8)

After releasing link 2, the random access command to the large capacity file stored in the FIFO of an I/F controller of large capacity storage medium MSD is sequentially executed, and the large capacity file data is transferred randomly to terminal T1 from the ATM switch & secondary server SVR.

(Procedure 9)

After completing random access to the file from terminal T1, signaling to release the link between ATM switch & secondary server SVR and terminal T1 is performed to complete the random data transfer of a large capacity file.

Figure 8:
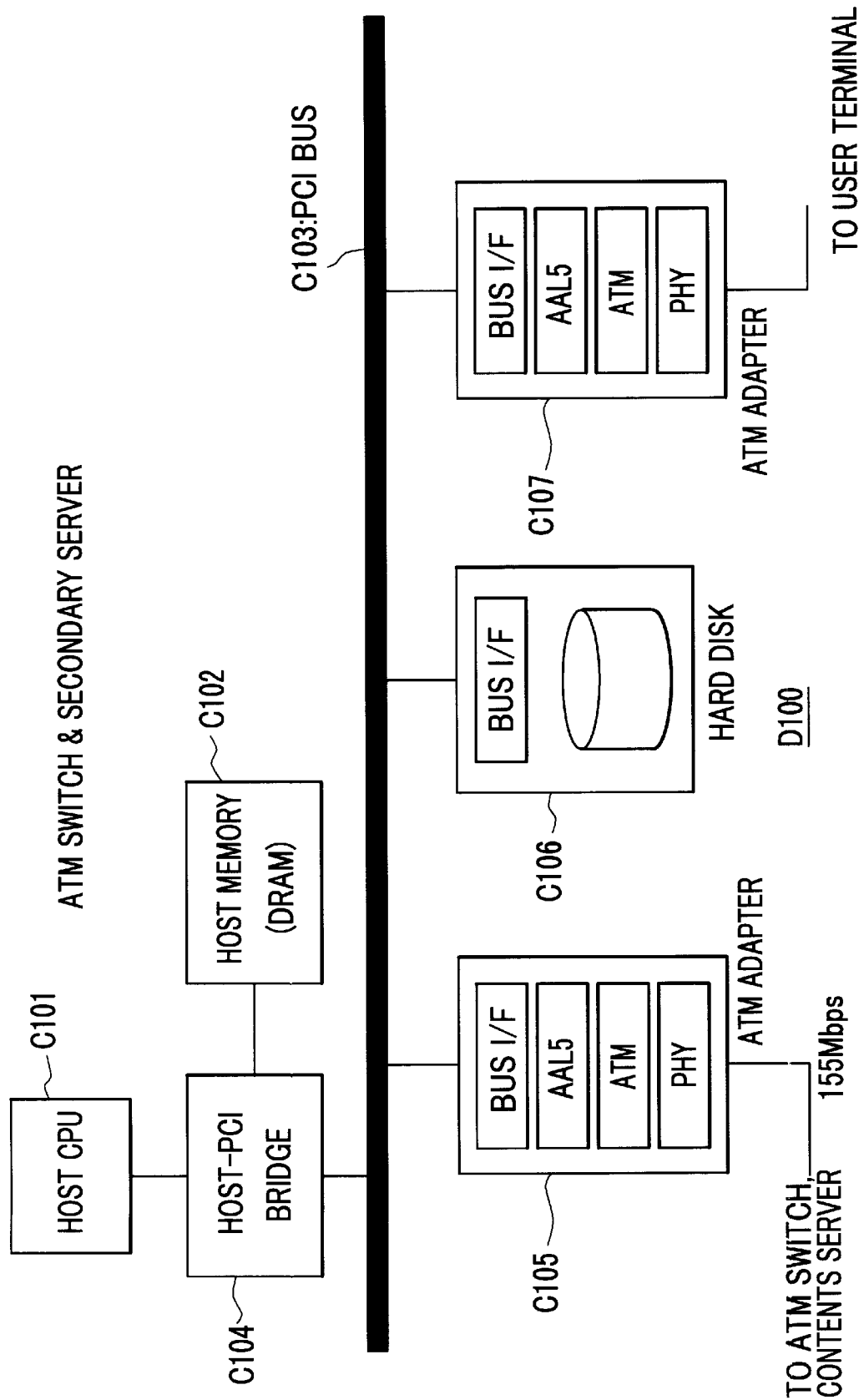
FIG. 8 is a block diagram showing a structure of an apparatus for executing the ATM file transfer method shown in FIG. 7.

In the following, concrete examples for achieving the aforementioned procedures will be explained. FIG. 8 is a block diagram showing a structure of an apparatus for executing the ATM file transfer method according to the same preferred embodiment. This same apparatus is an ATM switch & secondary server D100 comprising a general purpose computer. The configuration shown in same figure includes host CPU•C101, host memory C102 comprising DRAM (dynamic RAM) or the like, PCI bus C103 comprising a high speed general purpose bus, host-PCI bridge C104 connecting host CPU•C10 and PCI bus C103, a 155 Mbps ATM adapter C105 connected to the contents server side (described below), hard disk C106, and a 25 Mbps ATM adapter C107 connected to the user terminal side (described below).

Figure 9:
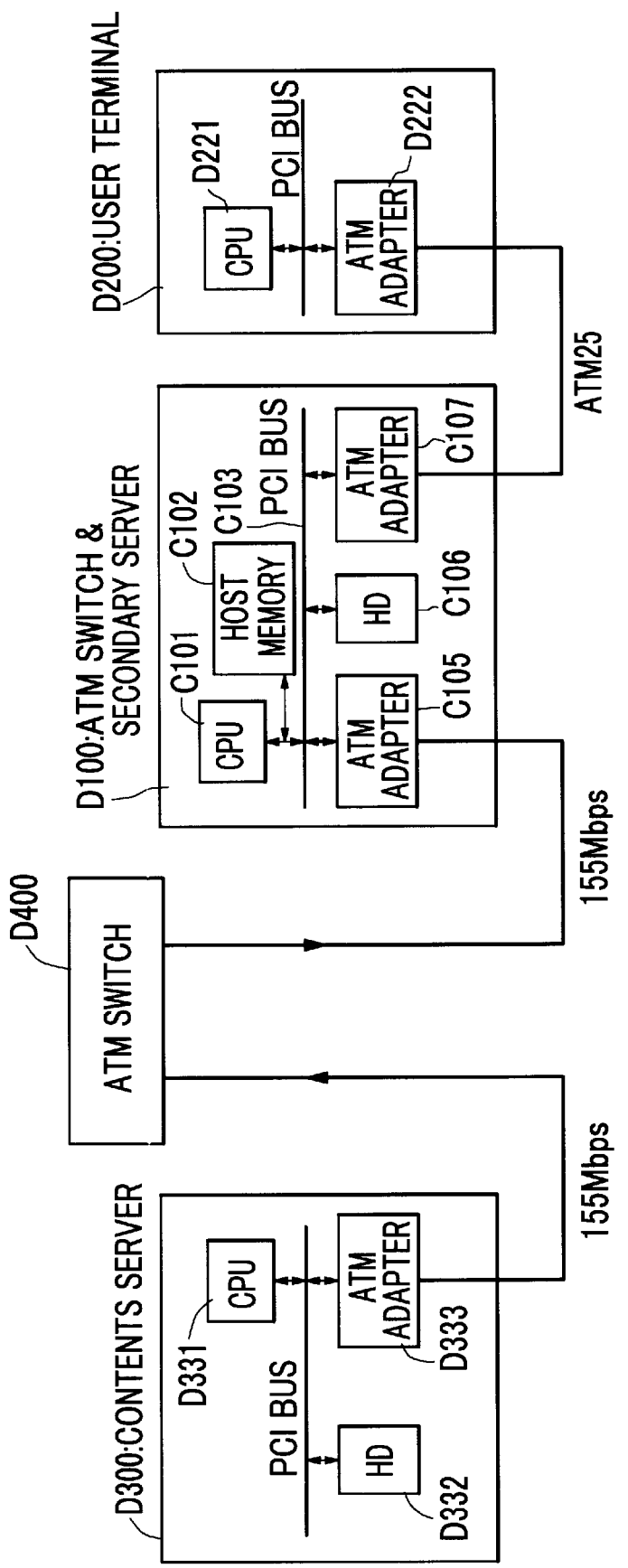
FIG. 9 is a diagram showing a structural example in the case when an ATM switch & secondary server D100, user terminal D200, contents server D300 and ATM switch D400 are connected via an ATM.

On the other hand, FIG. 9 shows a structural example in the case when an ATM switch & secondary server D100, user terminal D200, contents server and ATM switch are connected by means of an ATM. The configuration shown in FIG. 9 includes an ATM switch & secondary server D100 comprising a general purpose computer shown in FIG. 8, user terminal D200 such as a PC (personal computer) or the like, contents server D300, and ATM switch D400 connecting contents server D300 and ATM switch & secondary server D100.

Furthermore, user terminal D200 is constructed by means of connecting CPU•D221 and ATM adapter D222 by means of a PCI bus. In addition, contents server D300 is constructed by means of CPU•D331, hard disk D332, and ATM adapter D333 by means of a PCI bus.

In the following, an ATM file transfer method using the aforementioned configurations will be explained.

Figure 10:
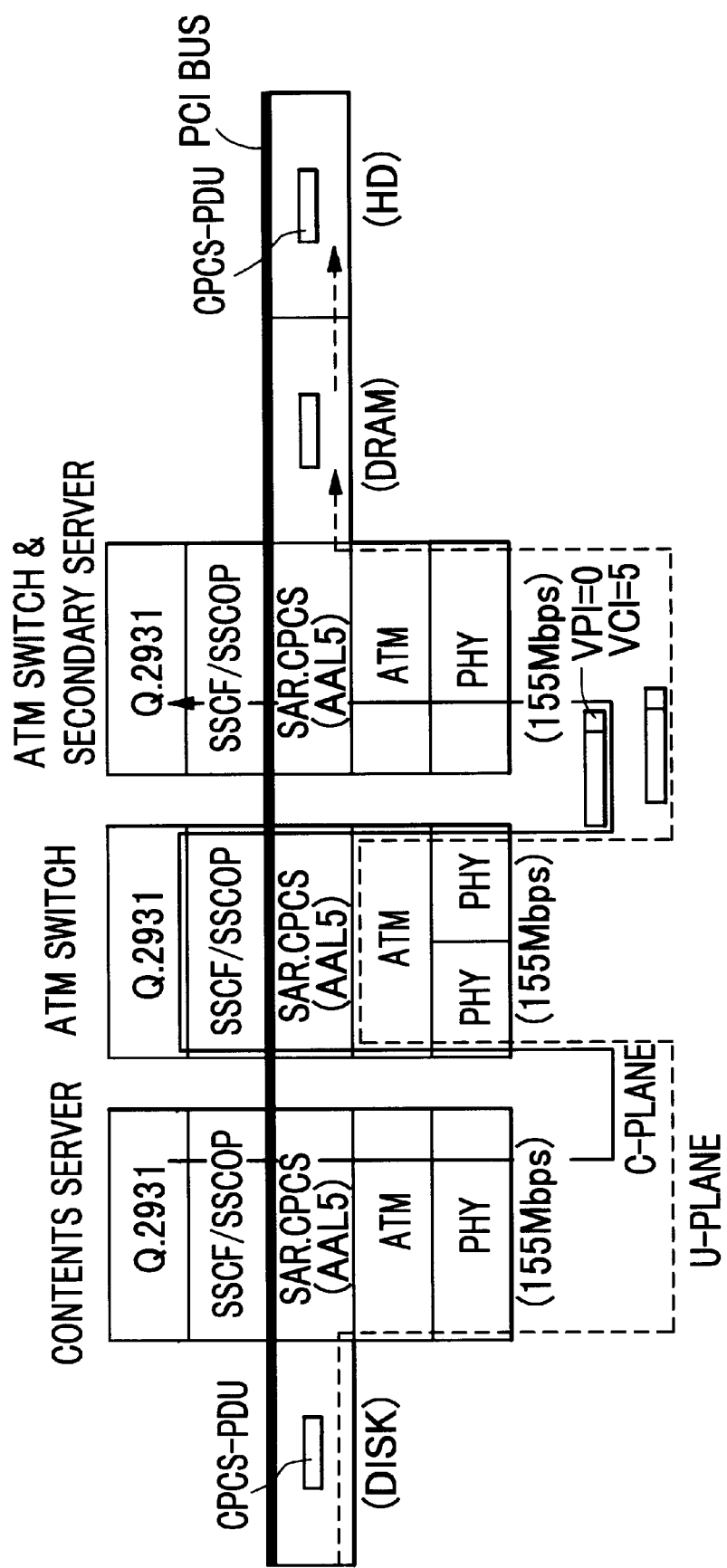
FIG. 10 is a diagram showing a protocol stack and data flow at the time of batch transferring large capacity file data from contents server D300 to ATM switch & secondary server D100.

Here, FIG. 10 is a diagram showing a protocol stack and data flow at the time of batch transferring large capacity file data from contents server D300 to ATM switch & secondary server D100 using the network of FIG. 9. Furthermore, in the same figure, SSCF is a service-dependent coordination function; SSCOP is a service-dependent coordination type protocol for stipulating a common function among all CO services; and SAR is a partition assembly cell sublayer.

Figure 11:
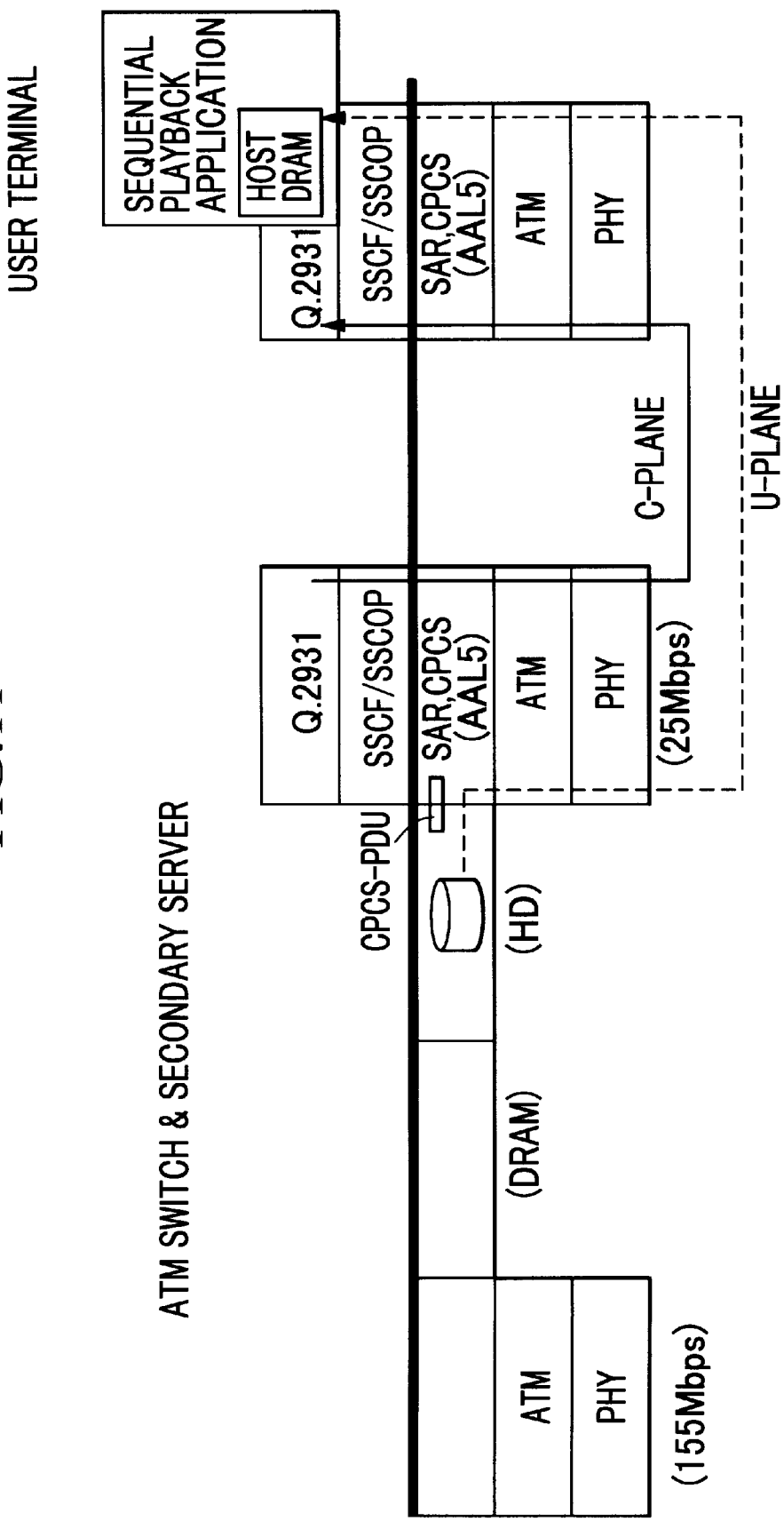
FIG. 11 is a diagram showing a protocol stack and data flow at the time of performing random access from a user terminal D200 with regard to ATM switch & secondary server D100.

In addition, FIG. 11 shows a protocol stack and data flow at the time of performing random access from a user terminal D200 with regard to ATM switch & secondary server D100. Initially, user terminal D200 attempts to designate an ATM link to an ATM address of contents server D300 by means of signaling (e.g., protocol Q.2931). At this time, ATM switch & secondary server D100 identifies specific VCI and VPI (VCI=5, VPI=0) as a signaling cell, and further recognizes that user terminal D200 is attempting to access a large capacity file (hard disk D332) of contents server D300 via the contents of the informational component carried by means of the signaling cell of Q.2931.

At this point, ATM switch & secondary server D100 dummies contents server D300, and performs signaling over the interval between user terminal D200, setting a link (25 Mbps) between user terminal D200 and hard disk C106 of ATM switch & secondary server D100. In other words, according to the present invention, an ATM link is not set between contents server D300 and user terminal D200. By means of this link, ATM switch & secondary server D100 appears as the contents server from the viewpoint of the user terminal D200. In addition, the command for random access of the large capacity file sent towards contents server D300 from user terminal D200 is stacked in FIFO (First In First Out memory: a first in first out type of memory, not shown in the figures, wherein information that is inputted first is similarly outputted first) within an I/F controller (PCI bus controller) of hard disk C106.

Subsequently, as shown in FIG. 10, ATM switch & secondary server D100 takes the place of user terminal D200, and sets a 155 MbPs ATM link with contents server D300 via ATM switch D400 by means of signaling (Q.2931) (see the data flow of the C-plane in FIG. 10).

After establishing a link, a large capacity file within contents server D300 to be accessed by user terminal D200 is sequentially read out; data terminated at each layer, i.e., PHY (physiological), ATM and AAL within ATM adapter C105 is transferred to PCI bus C103 in the form of CPCS-PDU (CS common section-Protocol data unit) and temporarily stored in host memory C102 via host-PCI bridge C014. At this time, processing of the layers below and including AAL within ATM adapter C105 is possible by means of all hardware.

Furthermore, the transfer speed of host memory C102, PCI bus C103 and host-PCI bridge C104 comprises a sufficiently high speed when compared with the transfer speed (155 Mbps) of the ATM link. Thus, it is possible to perform batch transfer of a large capacity file to host memory C102 without limiting the throughput of the 155 Mbps ATM link.

After completing file transfer to host memory C102, the ATM link between contents server D300 and ATM switch & secondary server D100 is released by means of signaling.

After releasing the ATM link, the data within host memory C102 is transferred again to hard disk C106 via host-PCI bridge C104 and PCI bus C103. Here, as mentioned above, the random access command to the large capacity file from user terminal D200 is stacked in the FIFO of an I/F controller within hard disk C106. By means of sequentially executing the aforementioned, the large capacity file data is consecutively transferred from ATM switch & secondary server D100 to user terminal D200 via ATM adapter C107 (25 Mbps) using an ATM link.

After completing random access with regard to a file from user terminal D200, signaling for ATM link release with user terminal D200 is conducted to complete random data transfer of a large capacity file.

As described above, according to the present embodiment, a computer, possessing a large capacity storage medium such as a host memory, hard disk or the like, and a data bus, functions an ATM switch & secondary server by being placed between terminals. As a result, at the time of accessing a second terminal from a first terminal, after performing batch transfer of a large capacity file from a second terminal to a large capacity storage medium, it is possible to randomly access the large capacity storage medium of the computer from a first terminal such that the computer is imaginatively seen respectively as the second terminal from the first terminal, and as the first terminal from the second terminal. In this manner, by means of combining a large capacity storage medium and ATM switch, not only is it possible to conduct speed conversion of an ATM link with a different interface speed, but it is also possible to utilize the large capacity storage medium as a secondary server. As a result, the large load from random accessing of a large capacity file can be dispersed, and a high transfer throughput can be achieved.

In addition, when constructing the apparatus from a general purpose computer such as a PC or the like, due to the use of a high speed general purpose data bus, in addition to the aforementioned effects, the above functions of the present invention can be accomplished inexpensively by means of a general purpose computer.

Furthermore, in the aforementioned preferred embodiments, an example is shown in which only a single user terminal D200 is connected to ATM switch & secondary server D100, however, it is also possible for the number of user terminals D200 to comprise a plurality of two or more.

Figure 12:
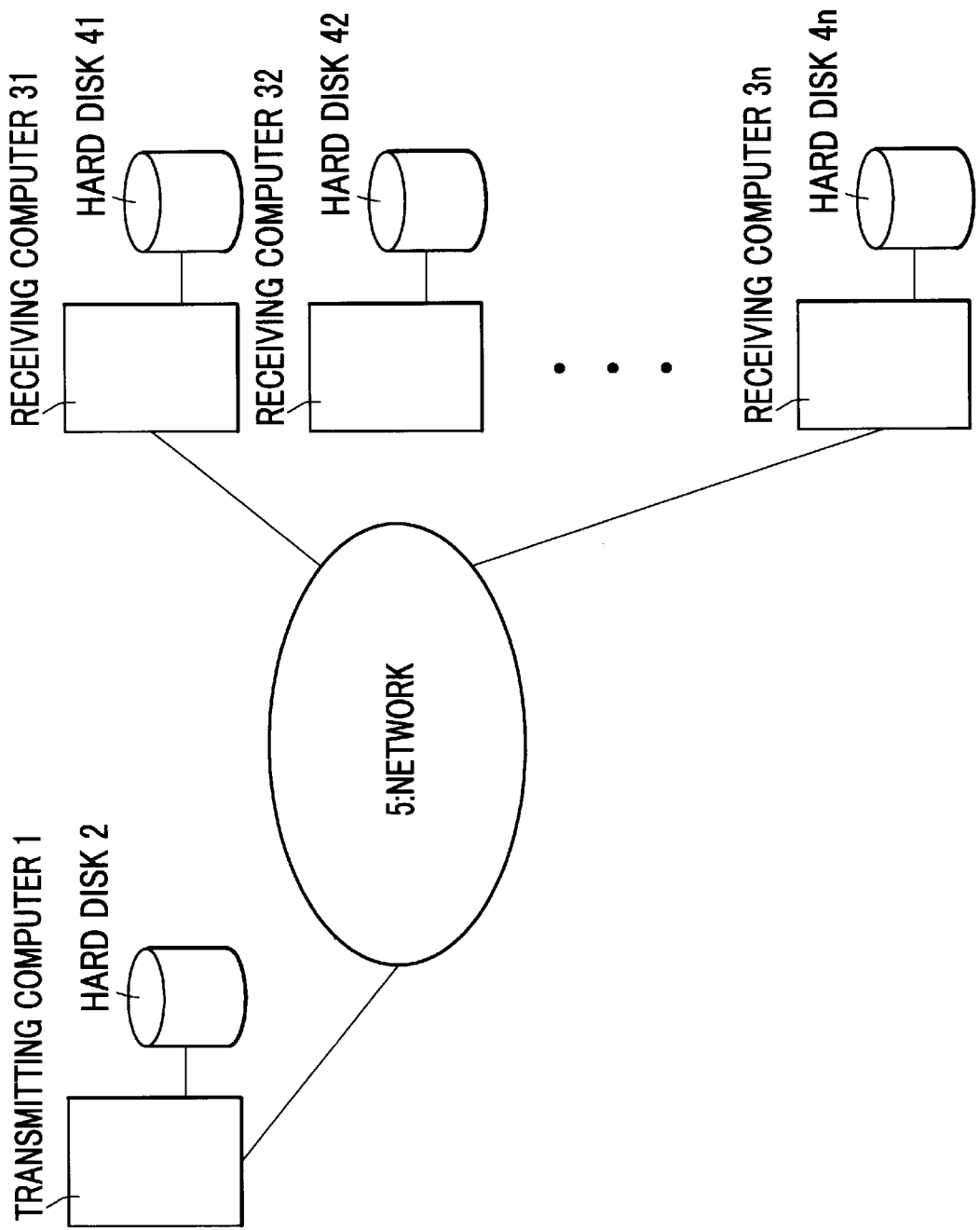
FIG. 12 is a diagram for explaining a preferred embodiment in which the present invention is applied when simultaneously accessing a large capacity file stored in a hard disk.

FIG. 12 is a diagram for explaining a preferred embodiment in which the present invention is applied while simultaneously accessing a large capacity file stored in a hard disk. FIG. 12 is a structural diagram of a file transfer apparatus according to a preferred embodiment of the present invention. This transfer system is equipped with a transmitting computer 1 comprising, for example, a personal computer, hard disk 2 of transmitting computer 1, receiving computer group 31~3n comprising, for example, personal computers, hard disks 1~4n of receiving computer group 31~3n, and network 5 connecting transmitting computer 1 and receiving computer group 31~3n.

In the following, the transfer operation of the aforementioned file transfer system will be explained. Initially a request for random access of a file is sent from receiving computer group 31~3n to transmitting computer 1. For example, in the case when applying the aforementioned system to a VOD system, transmitting computer 1 corresponds to the video server; the receiving computer group corresponds to the client; the file corresponds to video software such as a movie or the like; and random access corresponds to pausing, rewinding and fast forwarding this video software.

Instead of responding in real time to a plurality of simultaneous random access requests from a plurality of receiving computers 31~3n, transmitting computer 1 performs batch transfer by file of the files containing data requested by each of the receiving computers, and then copies them to hard disks 1~4n of the receiving computers. At this time, for example, during transfer to receiving computer 31, access requests from the other receiving computer group 32~3n are temporarily stacked by transmitting computer 1, and responses to these requests are not provided until transfer to receiving computer 31 is completed. In addition, the response to one receiving computer is not a direct response to random accessing of various portions within a single file, but instead comprises only sequential readout of a file from beginning to end. Each receiving computer locally performs random accessing of files with regard to files copied to the hard disk of the respective receiving computer.

In general, in a server system containing a plurality of clients, when attempting to directly respond to a random access from a client, the software interruption time and load of the server processor increases tremendously such that increasing the number of clients is difficult even when the server computer is upgraded. In addition, with regard to accessing a hard disk, mechanically, the seek mode speed for assigning a position to the disk cylinder following movement of the read-write head serves as the slowest element. This seek period hence becomes the "neck" such that the throughput during random access is tremendously reduced when compared with sequential reading/writing. In the end, actual processing, i.e., data readout, is broken up and performed, such that the conversion time between processing comes to occupy a large amount of the time required for the entire process.

As described by the aforementioned preferred embodiments, according to the method of the present invention, in reducing the interruption time and software processing as much as possible through a transmitting computer, and devoting hard disks to sequential readout, it is possible to improve the total throughput by means of minimizing the conversion time between processing.

Figure 13:
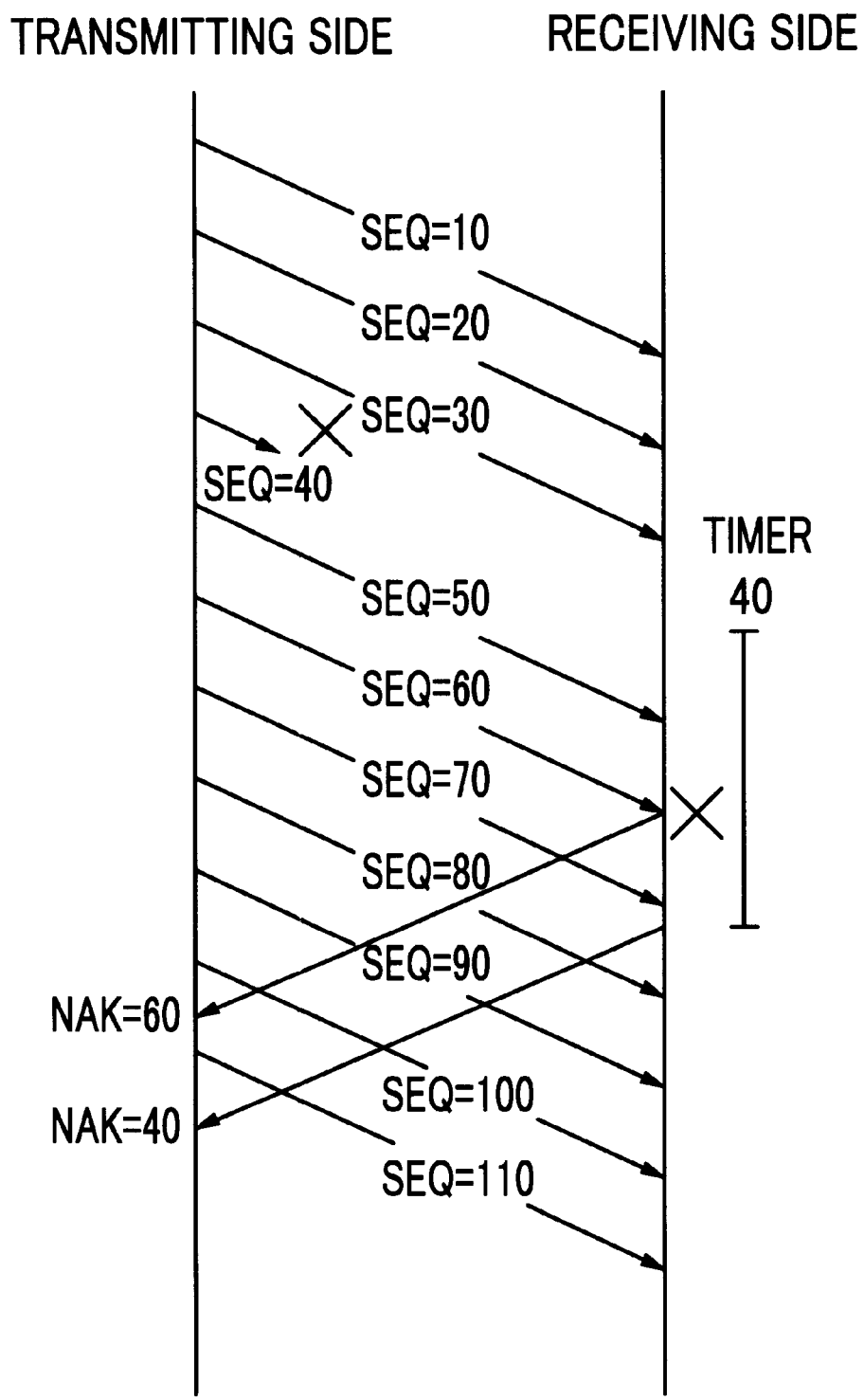
FIG. 13 is a diagram for explaining a data transfer procedure by means of a data transfer method of the present invention.

In the following, a data transfer procedure of another preferred embodiment will be explained in accordance with the data transfer method of the present invention. FIG. 13 is a time chart showing a data transfer procedure in a network in which a transmitting computer and receiving computer are connected. The transmitting computer and receiving computer are equipped with a transmitting side memory for storing data to be sent, and a receiving side memory for storing incoming data and timer for measuring the receiving time, respectively. When compared with the preferred embodiment shown in FIG. 1, the transmitting computer shown in FIG. 13 corresponds to the host CPU•F1 and peripheral devices used at the transmitting side shown in FIG. 1; while receiving computer shown in FIG. 13 corresponds to the host CPU•F1 and peripheral devices used at the receiving side shown in FIG. 1.

Furthermore, FIG. 13 shows, as an example, a case in which the packet of SEQ=40 is omitted with an error occurring in the data of SEQ=60.

The transmitting computer reads out data from the transmitting side memory and in response to a transmission protocol at that time, for example UDP/IP (User Datagram Protocol/Internet Protocol) and/or ATM/AAL-5, and divides the data that is read out into packets, followed by transmission to a network. The top address and packet length from the transmitting side memory of the packet are then recorded in the packet to be sent. The transmitting side then sends the data (SEQ=10, 20, . . . , 110) at the transfer speed according to the zone of the communication route without waiting for an acknowledgment (ACK) from the receiving side. The receiving computer which receives the packet then sequentially stores the receiving data into memory without returning an ACK to the transmitting side as long as there are no omissions or errors of the packet. In the event of an omission of the packet (the packet of SEQ=40), the receiving computer, after the passage of a predetermined amount of time, attaches transmitting side top address and packet length of the packet and retransmits a request to the transmitting side (NAK=40). In addition, in the case when an error occurs in the received packet (the packet of SEQ=60), that packet is immediately discarded, the transmitting side top address and packet length of the packet are attached, and a retransmission request is sent to the transmitting side (NAK=60). In the case when an omission and/or error occurs, the receiving computer leaves open the receiving side memory region where the omitted or discarded packet is to be stored, and subsequently stores error free packets received thereafter in a region downstream from this open region.

Furthermore, here, in the case when an omission of the packet occurs at the receiving side, after the passage of a predetermined amount of time, a retransmission request is sent to the transmitting side, however, it is also possible to send a retransmission request to the transmitting side immediately after the occurrence of an omission. In addition, it is also possible to determine the capacity of the receiving side memory region, which was supposed to store the packet where a packet length was not obtainable secondary to an omission or error, based on the value of the top address in the transmitting side memory attached to the subsequent, properly received packet (in this case, the packet of SEQ=50).

The transmitting side receiving the retransmission request reads out a retransmission packet from the transmitting side memory using the conveyed top address and packet length (NAK=60 and NAK=40), and reforms and retransmits the aforementioned packet to the receiving side. Following receipt of the retransmission packet, the receiving side reconstructs the retransmission packet as necessary and stores it into the receiving side memory region which had been left open. In this case, the transmitting side top address and packet length of the packet are attached to the retransmission request from the receiving side, and thus a retransmission packet can be easily reconstructed at the transmitting side. In addition, by stacking the respective values of the top address and packet length of the packets to which retransmission request exists, it is also possible to transmit all of the data without halting transmission in between and hence conduct retransmission of a plurality of packets together at the end.

In the following, an application of the data transfer method of the present invention to data transfer between computers using UDP/IP will be explained with reference to FIG. 14. According to this preferred embodiment, a UDP packet corresponds to the packet of data transfer. Conventionally, IP has gained wide popularity as a network layer protocol for "connectionless" communication; in such cases where a high reliability is required for data communication, a higher level transport layer protocol using the aforementioned TCP is normally employed. However, in the absence any extreme disturbance in the communication path, as long as the buffer amount of the receiving side is sufficient, it is possible to obtain a sufficiently reliable and efficient data transfer by employing UDP in the transport layer in addition to using the data transfer method of the present invention.

Figure 14:
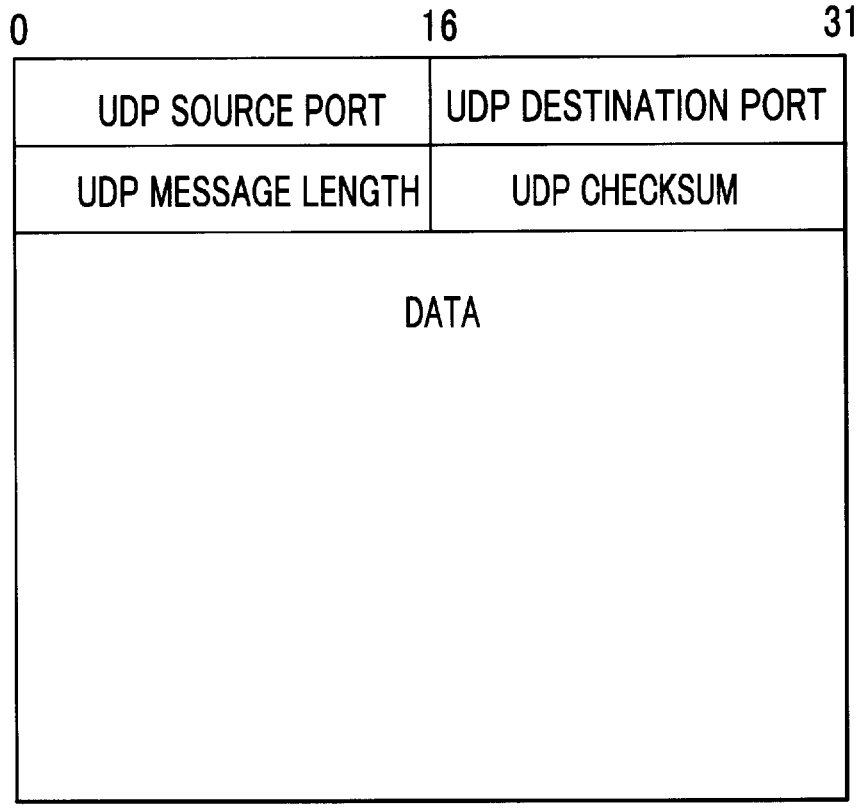
FIG. 14 is a diagram showing a UDP packet format.

FIG. 14 shows the format of a UDP packet. The size of the UDP packet has a maximum variable length of 64 kB. In this case, the packet length attached to the transmission packet is mapped to the length field of the UDP header. The transmitting side top address is mapped to the unused filed of the IP header (e.g., maximum 32 bit IP option field). According to the UDP, a dummy header wherein the IP addresses of the transmission source and destination are mapped is added and a sum check of the header and all data is conducted. By means of using this sum check, it is possible to detect damage of the packet currently being transmitted. In addition, omission of the packet is determined by the non-arrival of a specific top address of the packet within a time-out period to the receiving side. Using the aforementioned, data transfer and retransmission requests are conducted according to the above-described method.

In the following, an application of the data transfer method of the present invention to data transfer between computers using ATM/AAL-5 will be explained. According to this preferred embodiment, the CPCS-PDU (Common Part Convergence Sublayer-Protocol Data Unit) corresponds to the packet in data transfer, while the ATM cell corresponds to the cell in data transfer. AAL-5 is provided for the purpose of measuring the efficiency of data transfer, and hence conducts error checks only with each CPCS-PDU without providing headers and trailers to SAR-PDU (Segmentation and Reassembly-PDU: cell segmentation and reassembly sublayer).

Figure 15:
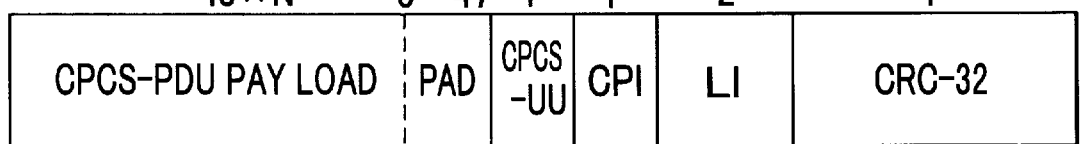
FIG. 15 is a diagram showing a ATM/AAL-5 CPCS-PDU format.

FIG. 15 shows a format of an AAL-5 CPCS-PDU. The size of the CPCS-PDU has a maximum variable length of 64 kB. In this case, the packet length attached to the transmission packet is mapped to the LI (length indicator) field of the CPCS-PDU trailer. The transmitting side top address is mapped to the unused field of the CPCS-PDU trailer (e.g., 8 bit CPCS-UU (CPCS user-to-user information)) and CPI (Common Part Identifier) field. According to the CPCS, CRC-32 (32-bit Cyclic Redundancy check) error check of a collected plurality of SAR-PDU is performed. The transfer unit is the ATM cell wherein an ATM header is attached to this SAR-PDU, and thus it is possible to simultaneously detect omission or damage of the cell by means of this CRC-32 check. Using the aforementioned, data transfer and retransmission requests are conducted according to the above-described method.

According to the present preferred embodiment, it is possible to simultaneously increase the transfer speed and improve the efficiency of retransmission of the packet, wherein an error was detected, by communicating the top address and length of the transmission packet between the transmitting and receiving sides without performing the conventional response confirmation at each packet.

As described in the aforementioned, according to the data transfer method of the present preferred embodiment, when transmitting data by dividing the data into a plurality of packets, due to the ability to conduct batch transfer without performing response confirmation at each packet, it is possible to markedly improve the transfer efficiency over that of the conventional technology. In addition, in the case when retransmission is required secondary to an error during communication, a method for selectively requesting retransmission of a specific packet from the receiving side is assumed wherein the top address of the packet as well as packet length are communicated between the transmitting and receiving sides. In this manner, there is no need to await the completion of a transmitting side timer in order to begin retransmission, and retransmission of excess packets does not occur. Furthermore, it is also possible to achieve efficient retransmission processing in a far more simple manner than compared with TCP and the like since software processing and memory management can be minimized at the time of reconstructing the retransmission packet at the transmitting side. In addition, the data transfer method of the present invention is particularly applicable for use in the transfer of bulk data.

In the following, the preferred embodiment of the data transfer method of the present invention shown in FIGS. 13~15 will be explained when applied to a configuration to which is added a relay computer that functions as a router between transmitting and receiving computers. According to this preferred embodiment, the relay computer provides the functions of the respective host CPU•F1 and peripheral devices used at each of the transmitting and receiving sides shown in FIG. 1.

Figure 16:
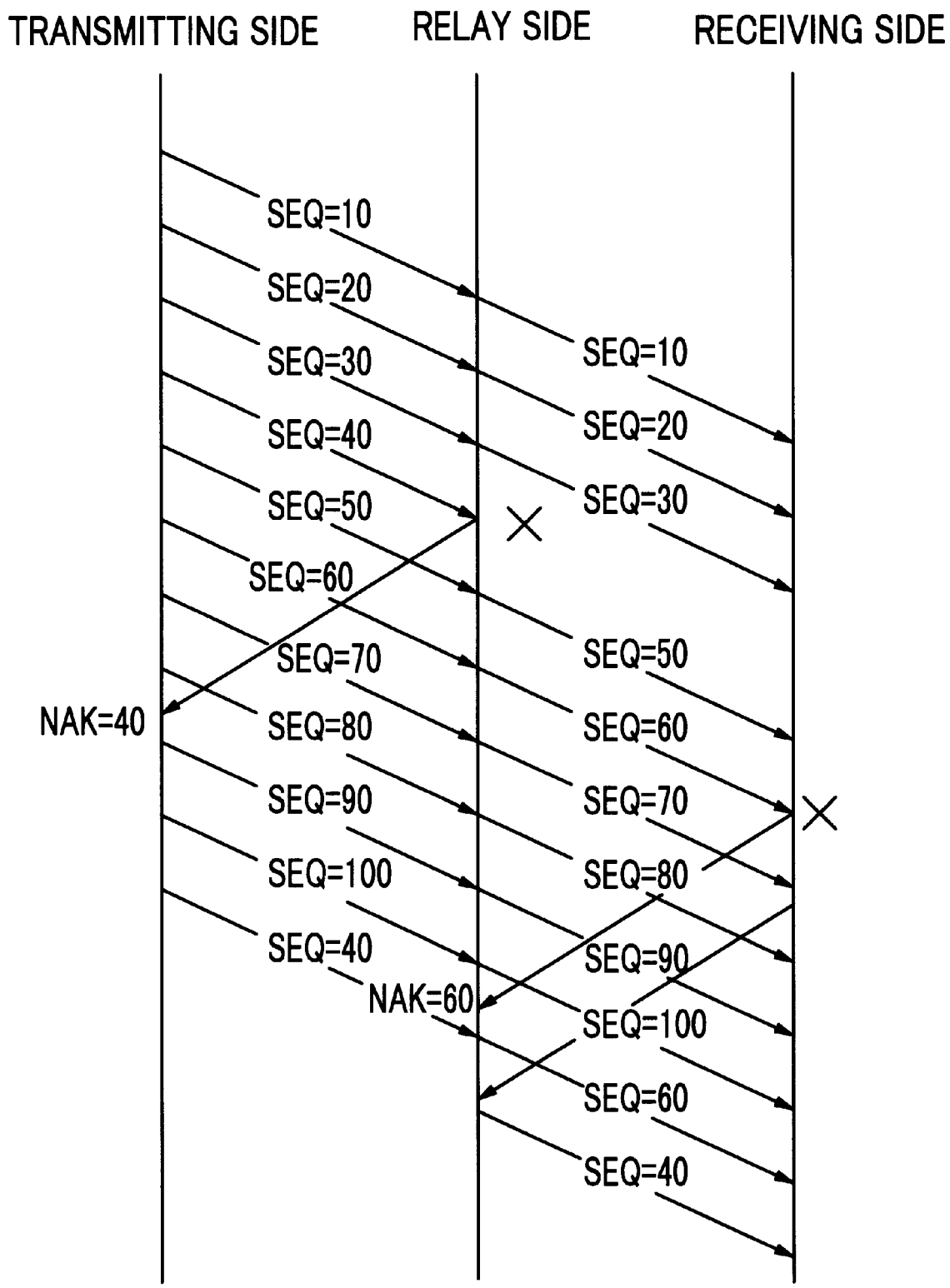
FIG. 16 is a diagram showing a data transfer sequence according to the present invention.

To begin with, an example in which the aforementioned is applied to data transfer between computers using AAl-5/ATM will be explained below. FIG. 16 shows a transfer sequence example in the present invention. According to this preferred embodiment, the CPCS-PDU corresponds to a packet in data transfer. The size of the CPCS-PDU has a maximum variable length of 64 kbytes.

The transmitting computer reads out data from memory in block units and encapsulates it into a CPCS-PDU payload. At this time, the offset address from the head of the file for conducting transfer of the aforementioned memory block is mapped to the CPCS-UU of the CPCS-PDU trailer portion and 16-bit portion of the CPI (See FIG. 15). Following ATM cell formation and termination of the physiological layer, the data is transmitted towards the destination (SEQ=10, 20, . . . 100).

By means of the computer for relaying data, termination of the physiological layer, ATM layer and AAL layer is performed. At the time of terminating the AAL layer, the address information mapped to the CPCS-UU and CPI is extracted; DMA (Direct Memory Access) transfer of the data in CPCS-PDU units is conducted to the memory region wherein the LI information, i.e., the above address and PDU size, is stored for data transfer via the aforementioned computer; and the aforementioned data is stored. In this manner, it is possible to conduct speed conversion of the transfer speed over the link interval by means of temporarily storing the data in the large capacity memory of a relay computer.

In the case when transferring data to the target computer, the data is read out from the aforementioned memory region by means of DMA transfer of the received address and length information. In this manner, with regard to data transfer within the apparatus, the load of the host CPU which had concentrated on transfer processing and memory management is reduced, and since software processing is not part of the transfer process, it is also possible to increase the speed of the aforementioned.

After reading out data from a memory region, the data is again encapsulated into a CPCS-PDU payload, and the attached address information is stored by the transmitting computer by means of loading addresses to the CPCS-UU and CPI. In this manner, high speed accumulation transfer using the address and size information is possible, in an end-to-end manner, over the memories of the computers from the transmitting computer to the receiving computer.

In the following, a preferred embodiment of the error data retransmission procedure will be explained. Termination of the physiological layer, ATM layer and AAL layer which received the data is performed by means of a computer for relaying the packet and the computer which will finally receives the packet. During termination of the AAL layer, in the event when an error is detected in the data (SEQ=40, 60) by means of the CRC-32 computer, this data is immediately discarded as a CPCS-PDU unit, and a cell for retransmission request (NAK=40, 60) containing the address and PDU length is sent to the computer which transmitted the data.

The computer receiving the retransmission request then reads out the data to be retransmitted from the memory region based on the address and PDU length, encapsulates and transmits it again in CPCS-PDU. In this manner, by performing data transfer by attaching the address and size information, and transferring data while storing data between the computers for conducting relay, it is possible to achieve a highly efficient retransmission, with hardware processing by the lower level layers as the main component, over not only the interval between the transmitting computer and receiving computer, but even between relay computers. In addition, the load from retransmission is drastically reduced when seen from the perspective of the entire network.

Figure 17:
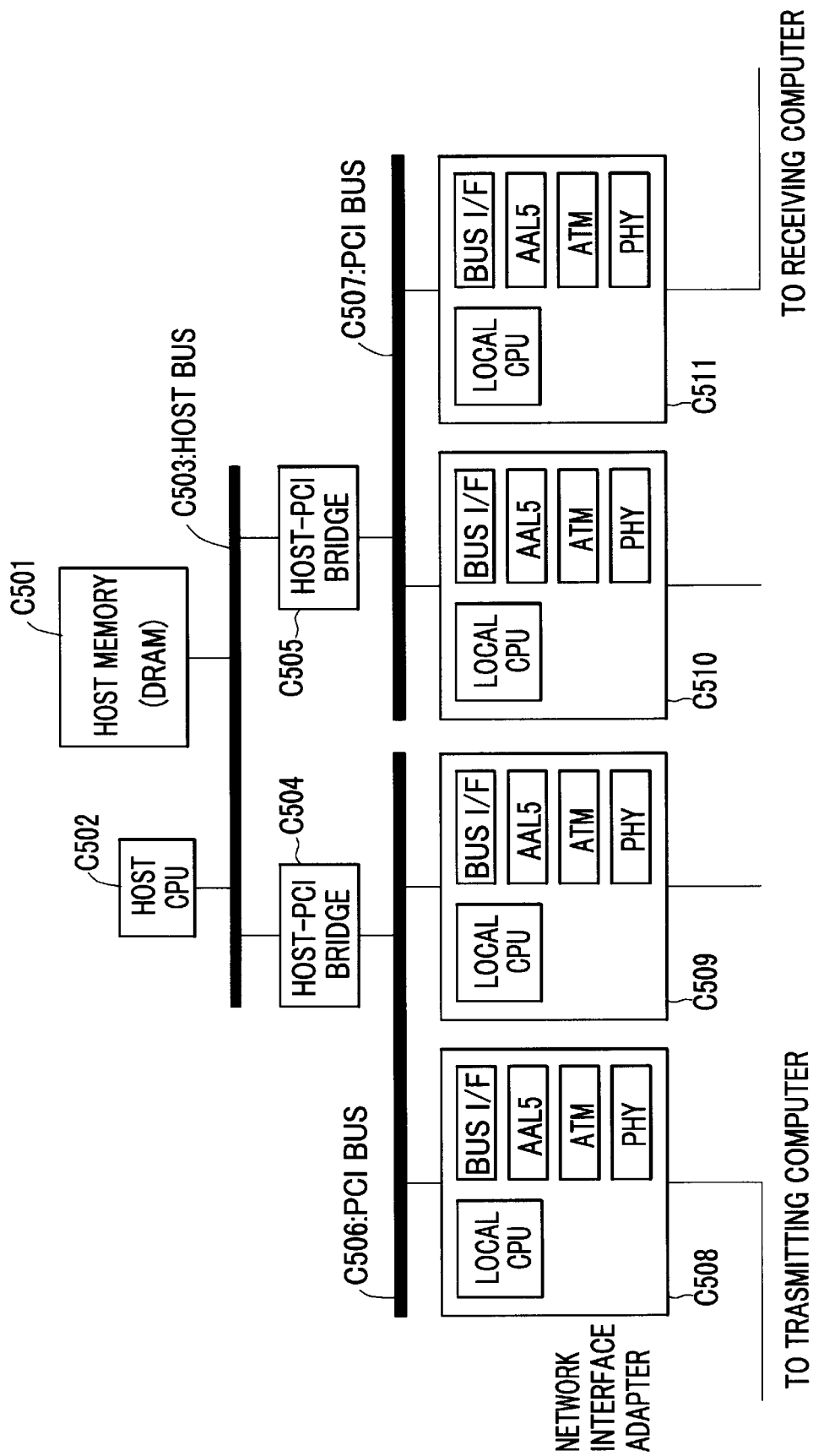
FIG. 17 is a diagram showing a structural example of a data transfer apparatus in the present invention.

In the following, a structural example of a data transfer apparatus which is formed from a general purpose computer architecture comprising a general purpose bus, large capacity memory, and network interface adapter for terminating network protocol, will be explained. FIG. 17 shows a structural example of such an apparatus. The configuration shown in the figure includes network interface adapters (or network interface adapter cards) C508, C509, C510 and C511 for receiving a packet and processing a physiological layer, ATM layer and AAl layer; PCI buses C506 and C507 which are high speed general purpose data buses; host-PCI bus bridge circuit C504 and C505 for interfacing a PCI bus and host bus; host bus C503; host CPU (central processing unit) C502 and host memory C501 formed by means of DRAM. Data is then transmitted by means of network interface adapter C508, and following termination of the physiological layer and ATM layer, the network interface adapter connected to the transfer destination computer is then identified by means of the VPI/VCI value of the cell header. A cell with the same VPI/VCI value is then buffered and termination within the card up to the AAL layer is conducted. At the time of terminating the AAL layer, a check for data error is conducted by CRC-32 computation, the address information and size mapped to the CPCS-PDU trailer portion is extracted, and the local CPU then sets DMA transfer in CPCS-PDU units with respect to the host memory C501. In the host memory C501, the host CPU previously notifies the local CPU of a base address and size of a region capable for use in transfer. Based on the address information extracted from the CPCS-PDU trailer portion, PDU length contained in LI, as well as the base address and size information of the host memory region for data accumulation received via notification from the host CPU, the local CPU recomputes the address contained in the host memory where calculation of a new address is possible as well. In this manner, it is possible to use the host memory as a ring buffer, and conduct data transfer without losing efficiency, even in the case when the memory region of the file size portion to be transferred cannot be secured. The local CPU of network adapter card C508 then sends notification of the aforementioned address and size information the local CPU of the transfer destination network interface adapter C511 determined from the VPI/VCI value. The local CPU of the network interface adapter C511 receiving the notification then sets DMA transfer and reads out the data from host memory C501. Following data readout, during processing of the AAL layer, the address receiving the aforementioned notification is mapped to the CPCS-PDU trailer portion (CPCS-UU and CPI). In this manner, the address information is stored. Subsequently, the information encapsulated by means of ATM layer processing is transmitted to the computer serving as the destination.

At this time, it is possible to independently operate PCI buses C506 and C507. Since the data transfer speed of the host bus (64 bit/66 MHz=528 MB/s) is faster than the PCI bus (32 bit/33 MHz=132 MB/s), data writing and readout appear to occur simultaneously with respect to host memory. For example, the packet received by the network interface adapter card C508 can be written into the host memory without regard for the traffic conditions of PCI bus C507. By reading out the data accumulated in host memory based on the traffic condition of PCI bus C507, during times of disruption, data is stored such that a high speed and smooth data transfer can be performed wherein data is directly readout during times when the traffic amount is low. The bus traffic controller performs high speed processing via hardware by means of by using the bus arbitration function of the host PCI bus bridge.

As described in the aforementioned, according to the preferred embodiment, it is possible to simplify memory management from software and increase the speed of storage-transfer processing during communication between computers by means of practically utilizing the address information and size information attached to a packet. Furthermore, it is also possible to selectively retransmit error data over not only the interval between the transmitting computer and receiving computer, but also between computers conducting relay, and hence an efficient retransmission processing can be achieved when compared with TCP. The data transfer method of the present invention is particularly applicable to transfer of bulk data.

In the following, another embodiment regarding address attachment to a packet will be explained in the context of the preferred embodiment described with reference to FIGS. 13–17.

Figure 18:
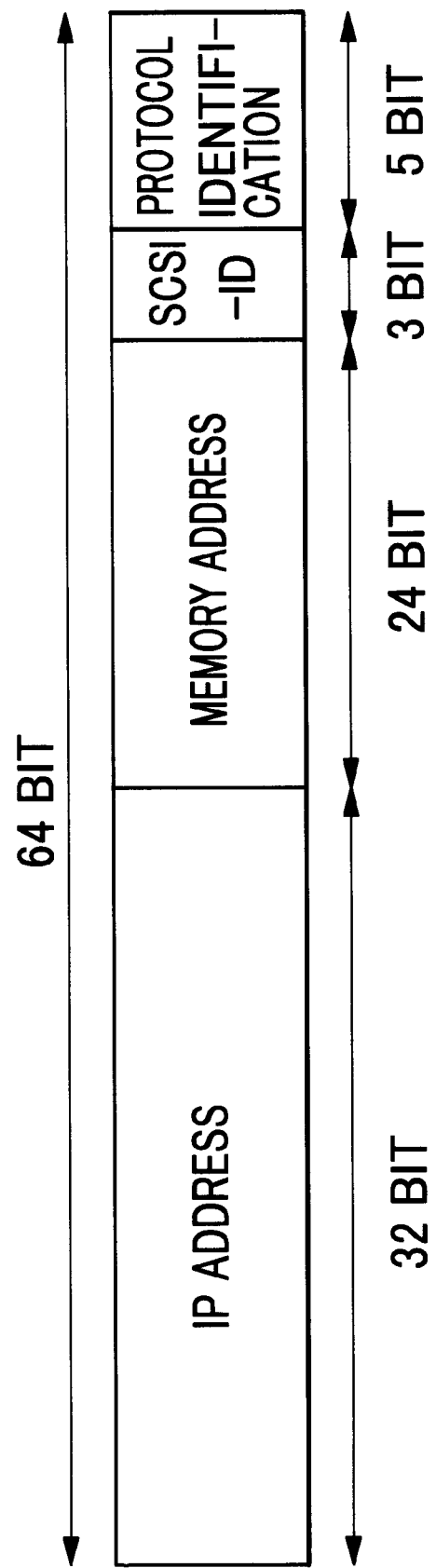
FIG. 18 is a diagram showing an example of an address morphology according to the present invention.

FIG. 18 is a diagram showing an example of a 64-bit address model according to a preferred embodiment of address attachment of the present invention. The leading 32-bit is an IP address which serves as a logical address for particularly running a communication partner using TCP/IP communication. The second 24-bit is a memory address showing a storage area where data is accumulated within the computer. However, this is not an absolute address which uses the zero region of memory as the origin, but instead serves as an offset address which uses the lead position of the file to be transferred as its origin. The third 3-bit is an SCSI-ID for recognizing an SCSI debias connecting to the SCSI (Small Computer System Interface) of the computer. The final 5-bit designates a communication protocol.

During communication, it is possible for the user to use the IP address as in the conventional technology. If the protocol used in the communication is a conventional IP address, it is possible to maintain the communication through the IP router as long as data below the memory address is encapsulated into an IP packet without being read. According to a protocol which conducts communication by means of attaching a memory address to the transfer memory block, the second memory address (offset address) is designed to be read. In addition, by means of using the third SCSI-ID, it is also possible to directly designate an SCSI debias within the computer.

By means of assuming an integrated address system such as described in the aforementioned, it is possible to establish a data communication device which does not require a communication protocol and/or computer interior or exterior.

Figure 19:
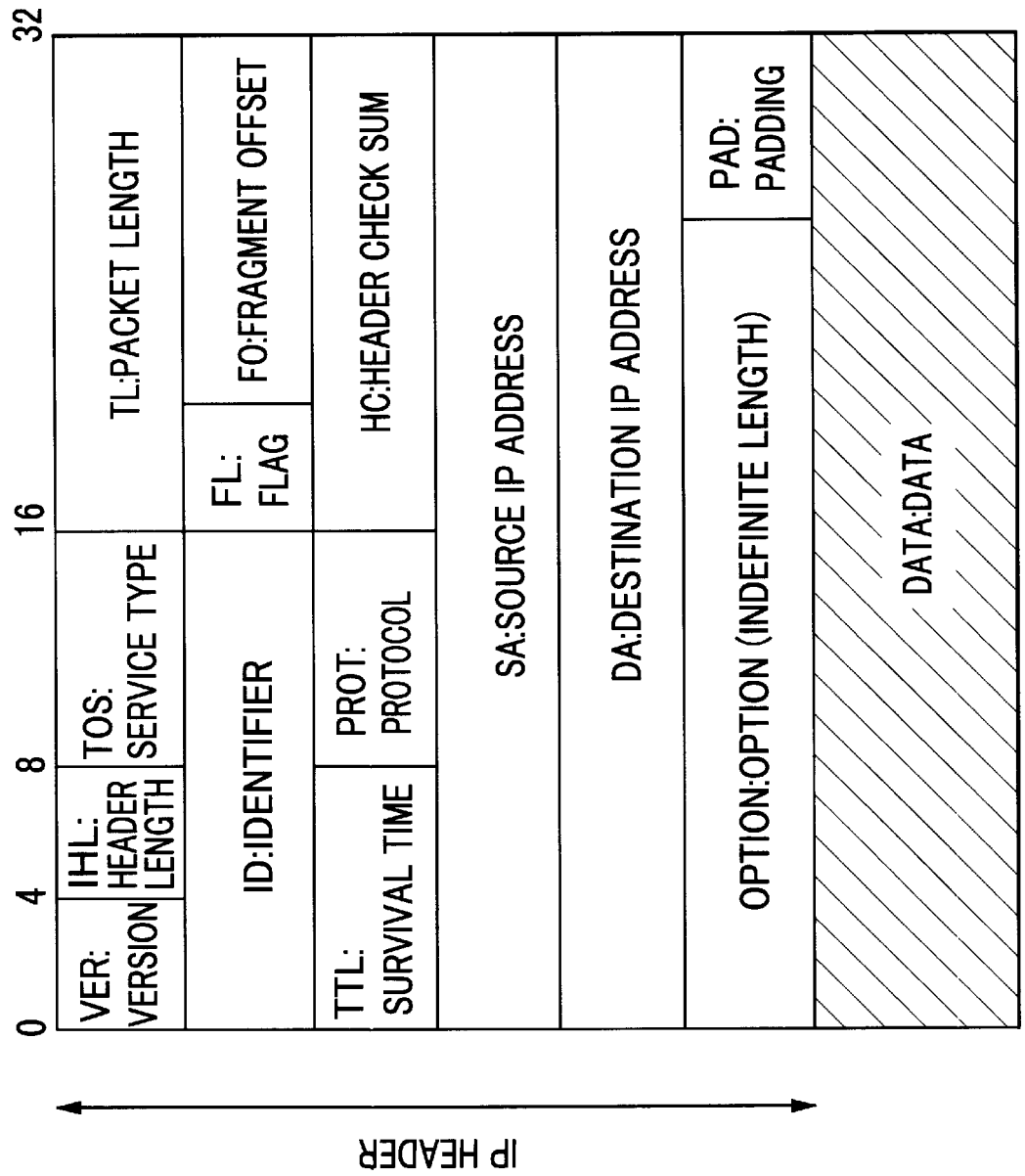
FIG. 19 is a diagram showing an example of an address morphology according to the present invention.

In addition, when using an IP as the protocol of a network layer, it is possible to attach an address to a packet as shown in FIG. 19. As shown in the figure, the IP information used in IP communication is normally contained within the IP header. An IP header is attached to the data for IP processing, and the data passed on from the upper layer(s) is encapsulated by means of the IP header and then passed on to the lower layer(s). On the other hand, data from the lower layer(s) releases the contents of the IP header and passes it onto the upper layer(s) when necessary. The optional field contained in the IP header possesses a variable length, but is not normally used except for security levels, source routes and the like. By means of mapping a memory address from a transfer memory block to this optional field, it is possible to conduct data transfer according to the present invention via a standard IP router.

Furthermore, the program for executing the file transfer method according to the present invention described using the aforementioned preferred embodiments can be stored in a storage medium such as a floppy disk, optical disk, magneto-optical disk and the like, and then distributed. In addition, it is also possible to distribute the aforementioned using a network such as an internet or the like.

The preferred embodiments of the present invention have been described with reference to the previously mentioned figures; however, various other modifications to the present invention can be made without deviating from the concept and main characteristics thereof. As a result, the aforementioned preferred embodiment are simply examples covering a gamut of points, but are not meant to restrict the present invention. The claims of the present invention describe the scope of what is claimed, but are not meant to be restricted by the contents of the present specification. Furthermore, the modifications and changes belonging to the theory of equivalence of the claims all fall within the claimed scope of the present invention.

What is claimed is:

1. A file transfer method comprising:
    a procedure for sequentially transferring file data to a second storage medium via a general purpose data bus while conducting at least one process from among compression, protocol termination and framing with regard to file data within a first storage medium prior to designating a communication link, at a transfer source of said file;
    a procedure for designating a communication link following completion of processing with regard to said file data at said transfer source of said file, and directly batch transferring file data within said second storage medium without processing to a network adapter card for use in computer communication which is connected to a general purpose data bus, and then transmitting said file data from said network adapter card to a network;

a procedure for batch transferring said file data transmitted to said network adapter card, which is connected to a general purpose data bus of said transfer destination from said network, via said general purpose data bus without conducting any processing from among data expansion, protocol termination, and framing, and then releasing said communication link, at the transfer destination of said file; and a procedure for transferring to said first storage medium sequentially processed data within said second storage medium via said general purpose data bus while conducting at least one process from among expansion processing and communication processing with regard to data within said second storage medium, at a transfer destination of said file, after releasing said communication link;

wherein a general purpose computer architecture is used which comprises a general purpose data bus for conducting data transfer, a first storage medium, and a second storage medium possessing a faster input/output speed than said first storage medium, at each of said file transfer source and file transfer destination.

2. A file transfer method as recited in claim 1, wherein when transferring said file data from said network adapter card to said network at said transfer source, said file data is transferred in one or a plurality of packet units; and a memory address is used as a network address for designating a transfer destination of said packet(s) reflecting the location where said data corresponding to said packet(s) is stored in said second storage medium of said transfer source.

3. A file transfer method as recited in claim 2, wherein an internet protocol (IP) is used as a protocol of a network layer, and said memory address is attached to an optional region of an IP header.

4. A file transfer method as recited in claim 3, wherein when transferring said file data from said network adapter card to said network at said transfer source, said file data is transferred in one or a plurality of packet units; and as a network address for designating a transfer destination of said packet(s), a unique primary source address is used which is defined by integrating a logical address of said network layer, a memory address reflecting the location where said data corresponding to said packet(s) is stored in said second storage medium of said transfer source, and a hardware address for identifying predetermined hardware of said transfer source.

5. A file transfer method as recited in claim 1, wherein:

said procedure for transferring said file data in one or a plurality of packet units, when transferring said file data from said network adapter card to said network at said transfer source, and transmitting said file data from said network adapter card to said network at said file transfer source comprises, a procedure for attaching a top address of data and packet length corresponding to said transmission packet in said second storage medium of said transfer source, and sequentially transmitting said packet without awaiting for an acknowledgment from said transfer source; and a procedure for selectively reading out and retransmitting from said second storage medium of said transfer source only those packet(s) for which a retransmission request is received at the time of receiving packet retransmission request from said transfer destination; and a procedure for releasing said communication link at said file transfer source comprises, a procedure for conducting error check of the packets received, and sequentially storing received packets that are free of en route data omissions or errors into said second storage medium of said transfer destination without returning an acknowledgment to said transfer source; and a procedure in which packets in which at least one data omission and/or data error is detected are directly discarded such that the memory region(s) where said packet(s) were to be stored are left open only an amount corresponding to the capacity of said packet(s), and packets free of data omissions and/or data errors received thereafter are sequentially stored where notification of the top address and packet length of said detected packet(s) along with a retransmission request are sent to said transfer source; and a procedure for storing said packet(s) in said memory regions which were left open after receiving a retransmission packet.

6. A file transfer method as recited in claim 1, wherein:

a plurality of terminals including a first terminal are connected to said file transfer destination via a network interface adapter card;

said transfer destination takes the place of said transfer source and establishes a first communication link with said first terminal at the time when said first terminal among said plurality of terminals reads out a data file from said file transfer source;

said transfer destination stacks random access requests to said file sent from said first terminal via said first link;

said transfer destination takes the place of said first terminal and establishes a second communication link with said transfer source;

said transfer destination sequentially reads out said data file from said transfer source using said second link and conducts batch transfer of said read out data file to a second storage medium of said transfer destination;

said transfer destination releases said second link following completion of said batch transfer;

said transfer destination transfers to a first storage medium of said transfer destination sequentially processed data within said second storage medium via said general purpose data bus while conducting at least one process from among expansion processing and communication processing with regard to data within said second storage medium;

said transfer destination sequentially executes said random access request, and transfers said file data in a random manner from said first storage medium of said transfer destination to said first terminal via said first link; and said transfer destination then releases said first link following completion of said random transfer.

7. A transfer method as recited in claim 6, wherein in the case when a plurality of random access requests from a plurality of terminals occur simultaneously with regard to said transfer source, said transfer destination arranges said plurality of simultaneous random access requests, and sequentially batches and reads out the data files requested via random access by each terminal from said transfer source.

8. A file transfer method as recited in claim 6, wherein:

said transfer destination functions as a packet router;

said transfer source, at the time when said transfer destination sequentially reads out said data file from said transfer source using said second link and conducts batch transfer to a second storage medium of said transfer destination, transmits said data file in one or a plurality of packet units, attaching to said packet(s) the memory address and size information indicating the location where data corresponding to said packet is stored within said second storage medium of said transfer source;

said transfer destination, at the time of transferring to a first storage medium of said transfer destination sequentially processed data within said second storage medium via said general purpose data bus while conducting at least one process from among expansion processing and communication processing with regard to data within said second storage medium of said transfer source, stores said received packet of said second storage medium into said first storage medium of said transfer destination based on the memory address and size information attached thereto by means of said transfer source;

said transfer destination, at the time of sequentially executing said random access requests and transmitting said file data from said first storage medium of said transfer destination to said first terminal via said first link, transmits to said first terminal, said data file in one or a plurality of packet units, again attaching to said packet(s) said memory address and size information attached by said transfer source; and in said first terminal, said data is further stored in a predetermined region of said first terminal based on said memory address and size information attached to said packet.

9. A storage medium storing a program for executing said data transfer method according to one of claims 1~8.

10. A file transfer apparatus comprising:
(1) a transfer source computer which comprises,
a first general purpose data bus for conducting data transfer;
a first storage medium;
a second storage medium possessing a faster input/output speed than said first storage medium;
a first network adapter card for use in computer communication which is connected to said first general purpose data bus;
a first transfer means for sequentially transferring file data to said second storage medium via said first general purpose data bus while conducting at least one process from among compression, protocol expansion and framing with regard to file data within said first storage medium, before designating a communication link;
transmitting means for designating a communication link after completing said processing of said file data, directly batch transferring said file data to said first network adapter card via said first general purpose data bus without conducting processing with regard to file data within said second storage medium, and
transmitting said file data from said first network adapter card to a network; and
(2) a transfer destination computer which comprises,
a second general purpose data bus for conducting data transfer;
a third storage medium;
a fourth storage medium possessing a faster input/output speed than said third storage medium;

a second network adapter card for use in computer communication which is connected to said second general purpose data bus;
a releasing means for batch transferring said file data, prior to being transmitted from said network to said second network adapter card, to said fourth storage medium via said second general purpose data bus without conducting processing including data expansion, protocol compression or framing, and releasing said communication link; and
a second transferring means for transferring sequentially processed data within said fourth storage medium to said third storage medium following release of said communication link, via said second general purpose data bus while conducting at least one process from among expansion processing and communication processing with regard to data within said fourth storage medium.

11. A file transfer apparatus as recited in claim 10, wherein said transfer source computer, when transmitting said file data from said first network adapter card to said network, transfers said data file in one or a plurality of packet units, and uses, as a network address designating said packet transfer destination, a memory address corresponding to the location where the data corresponding to said packet is stored within said second storage medium.

12. A file transfer apparatus as recited in claim 11, wherein an internet protocol (IP) is used as said network layer protocol; and said memory address is attached to an optional region of said IP header.

13. A file transfer apparatus as recited in claim 10, wherein said transfer source computer, when transmitting said file data from said first network adapter card to said network transfers said data file in one or a plurality of packet units, and uses, as a network address designating said packet transfer destination, a unique primary source address which is defined by integrating a logical address of said network layer, a memory address reflecting the location where said data corresponding to said packet is stored in said second storage medium, and a hardware address for identifying predetermined hardware of said transfer source computer.

14. A file transfer apparatus as recited in claim 10, wherein said transfer source computer, when transmitting said file data from said first network adapter card to said network, transfers said data file in one or a plurality of packet units;
said transmitting means possesses a means for attaching to said transmission packet, a packet length and top address of data corresponding to said packet in said second storage medium, and then sequentially transmitting said packet without waiting for an acknowledgment from said transfer destination computer; and a means for selectively reading out from said second storage medium and retransmitting packets for which retransmission requests were received at the time of receiving packet retransmission request(s) from said transfer destination computer; and
said releasing means possesses a means for conducting error checks of received packets, and sequentially storing received packets which are free of en route omissions and/or errors into said fourth storage medium without returning an acknowledgment to said transfer source computer; a means for directly discarding packets in which at least one data omission and/or data error is detected such that the memory region(s) where said packet(s) were to be stored are left open only an amount corresponding to the capacity of said packet(s), and sequentially storing packets free of data omissions and/or data errors received thereafter while notifying said transfer source computer of the top address and packet length of said detected packet(s) along with requesting retransmission therefrom; and a means for storing said packet(s) in said memory regions which were left open after receiving a retransmission packet.

15. A file transfer apparatus as recited in claim 10, wherein a plurality of terminals are connected to said transfer destination computer via a network interface card;

said transfer destination computer possesses a means which, at the time when a first terminal among said plurality of terminals reads out data files from said transfer source computer, takes the place of said transfer source computer and establishes a first communication link with said first terminal;

stacks random access requests to said file sent from said first terminal via said first link;

takes the place of said first terminal and establishes a second communication link with said transfer source computer;

sequentially reads out said data file from said transfer source computer using said second link, and batch transfers said read out data file to said fourth storage medium;

releases said second link following completion of batch transfer;

transfers sequentially processed data within said fourth storage medium to said third storage medium via said second general purpose data bus while conducting at least one process from among expansion processing and communication processing with regard to data within said fourth storage medium;

sequentially executes said random access requests and randomly transfers said file data from said third storage medium to said first terminal via said first link;

and then releases said first link following completion of random transfer.

16. A file transfer apparatus as recited in claim 15, wherein said transfer destination computer possesses a means for arranging said plurality of simultaneous random access requests, in the case when a plurality of random access requests from a plurality of terminals occur simultaneously with regard to said transfer source computer, and sequentially batches and reads out the data files requested via random access by each terminal from said transfer source computer.

17. A file transfer apparatus as recited in claim 15, wherein said transfer destination functions as a packet router;

said transfer source computer possesses a means for transmitting said data file in one or a plurality of packet units, attaching to said packet the memory address and size information indicating the location where data corresponding to said packet is stored within said second storage medium of said transfer source;

said transfer destination computer possesses a means for storing said received packet of said fourth storage medium into said third storage medium based on the memory address and size information attached thereto by means of said transfer source computer, at the time of transferring to said third storage medium sequentially processed data within said fourth storage medium via said second general purpose data bus while conducting at least one process from among expansion processing and communication processing with regard to data within said fourth storage medium; and a means for transmitting said data file in one or a plurality of packet units, again attaching to said packet, said memory address and size information previously attached by said transfer source computer; and then transmitting said packet to said first terminal, at the time of sequentially executing said random access requests and transmitting said file data from said third storage medium to said first terminal via said first link; and said first terminal possesses a means for further storing said data in a predetermined region of said first terminal based on said memory address and size information attached to said packet.

* * * * *